US012447109B2

(12) United States Patent
Price

(10) Patent No.: US 12,447,109 B2
(45) Date of Patent: Oct. 21, 2025

(54) SYSTEMS AND METHODS FOR PRE-FILLED MULTI-LIQUID MEDICAL DELIVERY DEVICES

(71) Applicant: Koska Family Limited, East Sussex (GB)

(72) Inventor: Jeff Price, Windermere, FL (US)

(73) Assignee: Koska Familiy Limited, East Sussex (GB)

( * ) Notice: Subject to any disclaimer, the term of this patent is extended or adjusted under 35 U.S.C. 154(b) by 465 days.

(21) Appl. No.: 17/982,396

(22) Filed: Nov. 7, 2022

(65) Prior Publication Data

US 2023/0064428 A1 Mar. 2, 2023

Related U.S. Application Data

(63) Continuation of application No. PCT/US2021/031452, filed on May 8, 2021.

(Continued)

(51) Int. Cl.

*A61J 1/20* (2006.01)
*A61J 1/06* (2006.01)

(Continued)

(52) U.S. Cl.

CPC ............. *A61J 1/2089* (2013.01); *A61J 1/067* (2013.01); *B65D 1/095* (2013.01); *B65D 81/3227* (2013.01); *A61J 1/2013* (2015.05)

(58) Field of Classification Search

CPC ........ A61J 1/2089; A61J 1/067; A61J 1/2013; A61J 1/065; A61J 1/2017; B65D 81/3227; B65D 1/095

See application file for complete search history.

(56) References Cited

U.S. PATENT DOCUMENTS 4,085,782 A 4/1978 Carlson
5,240,146 A 8/1993 Smedley (Continued)

FOREIGN PATENT DOCUMENTS

EP 3386461 10/2018
WO 2011130738 10/2011

(Continued)

OTHER PUBLICATIONS

International Search Report for Application PCT/IB2022/051429 dated Jun. 3, 2022; 4 pps.

(Continued)

*Primary Examiner* — Ariana Zimbouski
(74) *Attorney, Agent, or Firm* — RowanTree Law Group, PLLC; Magdalena M. Fincham

(57) ABSTRACT

A pre-filled medical delivery system can have a blow-fill-seal (BFS) component and a connection assembly. The BFS component can have first and second chambers, and first and second sealed ports. Each chamber can have a respective liquid agent therein. Each sealed port can be in fluid communication with a respective one of the chambers. The connection assembly can be constructed for coupling to the BFS component. When coupled to the BFS component, the connection assembly can breach the seals of the first and second ports and provide fluid communication therebetween. The disclosed systems, when assembled, can combine the liquid agents from the first and second chambers of the BFS component and deliver the combination as a single dose of a therapeutic agent (e.g., vaccine, drug, medicament, etc.) to a patient.

27 Claims, 7 Drawing Sheets

Related U.S. Application Data

(60) Provisional application No. 63/021,870, filed on May 8, 2020.

(51) Int. Cl.
*B65D 1/09* (2006.01)
*B65D 81/32* (2006.01)

(56) References Cited

U.S. PATENT DOCUMENTS

| | | | | |
|---|---|---|---|---|
| 5,478,323 | A | 12/1995 | Westwood | |
| 5,505,704 | A | 4/1996 | Pawelka | |
| 5,605,255 | A | 2/1997 | Reidel | |
| 6,200,296 | B1 | 3/2001 | Dibiasi | |
| 6,764,463 | B1 | 7/2004 | Farris | |
| 2009/0099547 | A1* | 4/2009 | Radmer | A61J 1/2089 604/82 |
| 2009/0216183 | A1 | 8/2009 | Minotti | |
| 2009/0216212 | A1 | 8/2009 | Fangrow, Jr. | |
| 2011/0186451 | A1 | 8/2011 | Pontus | |
| 2012/0298254 | A1 | 11/2012 | Brem | |
| 2013/0269825 | A1 | 10/2013 | Osborn | |
| 2014/0054295 | A1 | 2/2014 | Holtwick | |
| 2014/0224815 | A1 | 8/2014 | Gallem | |
| 2015/0065993 | A1 | 3/2015 | Arocha | |
| 2015/0136622 | A1 | 5/2015 | Genosar | |
| 2015/0217058 | A1* | 8/2015 | Hooven | A61M 5/145 604/403 |
| 2015/0359708 | A1* | 12/2015 | Boomgard | A61J 1/1412 206/459.5 |
| 2017/0135903 | A1* | 5/2017 | Wattelier | A61J 1/2068 |
| 2018/0235839 | A1 | 8/2018 | Johnson | |
| 2019/0022336 | A1 | 1/2019 | Basile | |
| 2019/0060168 | A1 | 2/2019 | Koska | |
| 2019/0151198 | A1* | 5/2019 | Juhnke | A61M 39/24 |
| 2020/0237621 | A1 | 7/2020 | Naygauz | |
| 2020/0276082 | A1 | 9/2020 | Koska | |
| 2023/0241328 | A1 | 8/2023 | Koska | |
| 2023/0285676 | A1 | 9/2023 | Koska | |

FOREIGN PATENT DOCUMENTS

| | | |
|---|---|---|
| WO | 2014028745 | 2/2014 |
| WO | 2019246435 | 12/2019 |
| WO | 2021226564 | 11/2021 |
| WO | 2022053948 | 3/2022 |
| WO | 2022091003 | 5/2022 |
| WO | 2022180488 | 9/2022 |

OTHER PUBLICATIONS

Written Opinion for Application PCT/IB2022/051429 dated Jun. 3, 2022; 6 pps.

International Search Report for PCT Application No. PCT/IB2021/058168 dated Nov. 22, 2021; 6 pps.

International Search Report for PCT Application No. PCT/IB2021/059993 dated Jan. 28, 2022; 4 pps.

International Search Report for PCT Application No. PCT/US21/31452 dated Sep. 1, 2021; 2 pps.

International Written Opinion for PCT Application No. PCT/IB2021/058168 dated Nov. 22, 2021; 9 pps.

International Written Opinion for PCT Application No. PCT/IB2021/059993 dated Jan. 28, 2022; 8 pps.

International Written Opinion for PCT Application No. PCT/US21/31452 dated Sep. 1, 2021; 15 pps.

* cited by examiner

SYSTEMS AND METHODS FOR PRE-FILLED MULTI-LIQUID MEDICAL DELIVERY DEVICES

CLAIM OF PRIORITY

This application is a Continuation Application of PCT Application No. PCT/US21/31452, filed on May 8, 2021 in the name of Jeff Price and titled SYSTEMS AND METHODS FOR PRE-FILLED MULTI-LIQUID MEDICAL DELIVERY DEVICES, which PCT Application claims benefit of and priority under 35 U.S.C. § 119(e) to, and is a Non-provisional of, U.S. Provisional Patent Application No. 63/021,870 filed on May 8, 2020 and titled "SYSTEMS AND METHODS FOR PRE-FILLED DUAL-LIQUID MEDICAL DELIVERY DEVICES." Each of these Applications is hereby incorporated by reference herein in its entirety, for all purposes.

STATEMENT REGARDING FEDERALLY SPONSORED RESEARCH

This invention was made with government support under Award No. 75A50120000007, awarded by the Department of Health and Human Services (HHS). The government has certain rights in the invention.

BACKGROUND

Every year, millions of people become infected and die from a variety of diseases, some of which are vaccine-preventable. Although vaccination has led to a dramatic decline in the number of cases of several infectious diseases, some of these diseases remain quite common. In many instances, large populations of the world, particularly in developing countries, suffer from the spread of vaccine-preventable diseases due to ineffective immunization programs, either because of poor implementation, lack of affordable vaccines, or inadequate devices for administering vaccines, or combinations thereof.

Some implementations of immunization programs include administration of vaccines via a reusable syringe. However, in many situations, particularly in developing countries, the administration of vaccines occur outside of a hospital and may be provided by a non-professional, such that injections are given to patients without carefully controlling access to syringes. The use of reusable syringes under those circumstances increases the risk of infection and spread of blood-borne diseases, particularly when syringes, which have been previously used and are no longer sterile, are used to administer subsequent injections. For example, the World Health Organization (WHO) estimates that blood-borne diseases, such as Hepatitis and human immunodeficiency virus (HIV), are being transmitted due to reuse of such syringes, resulting in the death of more than one million people each year.

SUMMARY

Embodiments of the disclosed subject matter provide systems, assemblies, kits, and methods for medical delivery of liquid agents to a patient. Using a blow-fill-seal (BFS) fabrication technique, a BFS component (such as a vial) is pre-filled with respective fluid (e.g., liquid) agents, which are maintained in separate sealed chambers within the BFS vial, for example, until ready for use. In some embodiments, a connection assembly can be coupled to the BFS vial to breach seals of the BFS vial and to provide fluid communication between the respective chambers. In some embodiments, the seals can be selectively removed, pierced, or otherwise breached prior to or in place of the coupling the connection assembly. The liquid agents from the separate chambers can thus be combined prior to or during (e.g., en route) administration to a patient. In some embodiments, the combined liquid agents are administered via a needle or cannula coupled to the BFS vial or via a nozzle coupled to the BFS vial. For example, embodiments of the disclosed subject matter can deliver the combination of the liquid agents from the BFS vial as a single dose of a therapeutic agent (e.g., vaccine, drug, medicament, etc.).

In one or more embodiments, a pre-filled medical delivery system comprises a blow-fill-seal (BFS) vial and a connection assembly. The BFS vial can comprise a first chamber, a first port, a second chamber, and a second port. The first chamber can have a first liquid agent therein, and the second chamber can have a second liquid agent therein. The first port can be in fluid communication with the first chamber, and the second port can be in fluid communication with the second chamber. The connection assembly can be constructed to be coupled to the BFS vial so as to breach seals of the first and second sealed ports and to provide fluid communication between the first and second ports. In some embodiments, components of the pre-filled medical delivery system can be provided as a kit for assembly prior to administration of the liquid agents of the BFS vial to a patient.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

Where applicable, some elements may be simplified or otherwise not illustrated in order to assist in the illustration and description of underlying features. For example, in some figures, some components have been illustrated using a partial or cutaway view in order to illustrate internal interaction of components. Throughout the figures, like reference numerals denote like elements. An understanding of embodiments described herein and many of the attendant advantages thereof may be readily obtained by reference to the following detailed description when considered with the accompanying drawings, wherein.

DETAILED DESCRIPTION

I. Introduction

Figure 1A:
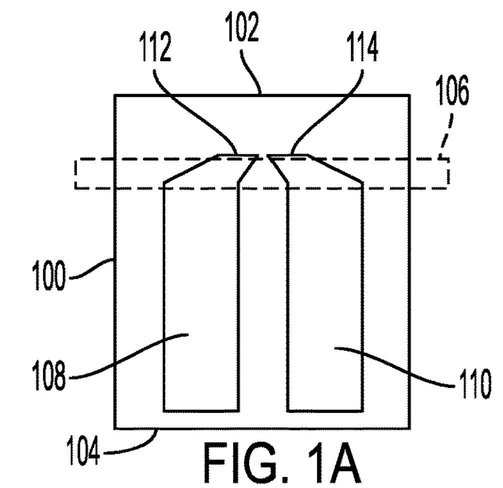
FIGS. 1A-1B are simplified schematic diagrams of blow-fill-seal (BFS) vial of a pre-filled medical delivery system prior to and after exposure of sealed ports, respectively, for administration of combined liquid agents, according to one or more embodiments of the disclosed subject matter.

Described herein are systems, assemblies, kits, and methods for medical delivery of multiple fluid (e.g., liquid) agents (e.g., at least two) to a patient (e.g., human or animal) from a pre-filled (and, in some embodiments, field-assembled or assembled at the point-of-use) component and/or vial. In some embodiments, at least two liquid agents are sealed within vial and retained separate from each other until a time when it is desirable to mix the liquid agents (e.g., at the time or prior to delivery to the patient). The liquid agents can be any type of agent to be injected into or otherwise administered to a patient and capable of producing a therapeutic effect, either alone or in combination with an active ingredient. Accordingly, the liquid agents can include, but are not limited to, separate vaccines, drugs, medicaments, diluents, active ingredients, etc. that are desirable to combine for common administration to the patient. For example, in some embodiments, the combination of the liquid agents can form a multi-fluid agent, solution, mixture, suspension, etc. Alternatively or additionally, the liquid agents can be separate components that, when combined, form a vaccine, drug, medicament, etc. For example, in some embodiments, the combination of the liquid agents can comprise a single dose of a therapeutic agent (e.g., vaccine, drug, medicament, etc.). In some embodiments, one or more of the liquid agents in the vial can be tracked, monitored, checked for compatibility, etc., such as by utilization of electronic data storage devices (not shown) coupled to the various modules or components of the delivery system.

In some embodiments, the component may comprise at least one blow-fill-seal (BFS) vial that has multiple chambers prefilled with respective liquid agents using a BFS manufacturing technique. At least some of the chambers filled with liquid agents can be sealed from other of the chambers, thereby maintaining the liquid agents separate until combination thereof is desired (e.g., a time for administration to the patient). The BFS vial may be constructed, filled, and sealed, according to some embodiments, in a sterile manufacturing environment. BFS vials may, for example, offer a less expensive alternative to typical vials or devices created via other manufacturing techniques. In some embodiments, BFS vials (e.g., due to the nature of the BFS manufacturing process) may not require separate sterilization (e.g., and may accordingly be compatible with a wider array of liquid agents), may provide enhanced production rates of sterile/aseptic units per hour, and/or may be provided to an end-user for significantly lower per dose/unit costs.

In some embodiments, a connection assembly can be coupled to the BFS vial to breach seals of the BFS vial and to provide fluid communication between the respective chambers to allow mixing of liquid agents. The liquid agents from the separate chambers can thus be combined prior to or during administration (e.g., en route from the BFS vial) to a patient. For example, in some embodiments, the combination (e.g., mixing) can occur within the connection assembly itself or in one or more chambers of the BFS vial. Alternatively, in some embodiments, the seals can be selectively removed, pierced, or otherwise breached prior to coupling the connection assembly. Alternatively, in some embodiments, the seals can be selectively removed, pierced, or otherwise breached without subsequent coupling of a connection assembly. For example, one or more portions of the BFS vial can be removed to expose adjacent outlet ports of the chambers, where the combination of liquid agents occurs in a region proximal to the exposed outlet ports.

In some embodiments, the combined liquid agents can be administered to a patient via an administration assembly. In some embodiments, the administration assembly comprises a needle or cannula coupled to the BFS vial. For example, the needle can be constructed for subcutaneous, intramuscular, intradermal, or intravenous injection of the combined liquid agents into the patient. Alternatively, in some embodiments, the administration assembly comprises a nozzle coupled to the BFS vial. For example, the nozzle can be a spray nozzle that facilitates dispersion of the combined liquid agents into a spray, which configuration may be useful in the administration of the combined liquid agents into a body cavity or orifice (e.g., nasal passage, ear canal, etc.). In another example, the nozzle can be a droplet nozzle that facilitates formation of droplets of the combined liquid agents, which configuration may be useful in the administration of the combined liquid agents to the eyes, for topical application, etc. Alternatively, in some embodiments, the combined liquid agents can be administered directly from the BFS vial without an administration assembly coupled thereto.

In some embodiments, the administration assembly and/or the connection assembly may be configured to be coupled and/or assembled to the BFS vial on-site and/or in the field. Alternatively or additionally, in some embodiments, the administration assembly and/or the connection assembly may be coupled and/or assembled to the BFS vial in a manufacturing facility and provided to users as a single, pre-assembled medical device. The pre-filled multi-liquid medical delivery device may, for example, be capable of delivering combined liquid agents in a controlled manner and without requiring specialized skill in assembling and/or administering delivery of such agent.

II. Parallel Configuration Examples for Pre-Filled Medical Delivery Systems

In some embodiments, the pre-filled medical delivery system is constructed to deliver fluid (e.g., liquid) agents from respective chambers of the BFS component in parallel (e.g., with respect to a fluid dispensing path) for administration to the patient. For example, FIG. 1A illustrates an initial sealed state of an exemplary pre-filled medical delivery system employing a parallel configuration. The BFS component (e.g., vial) 100 of the medical delivery system can have a first longitudinal end 102 and an opposite second longitudinal end 104. The BFS vial 100 can have a first chamber 108 containing a first liquid agent therein and a second chamber 110 containing a second liquid agent therein. In some embodiments, the first chamber 108 and the second chamber 110 are substantially the same volume and/or contain substantially the same volume of respective liquid agent therein. Alternatively, in some embodiments, one of the first and second chambers has a larger volume than the other, and/or one of the first and second chambers has a larger volume of respective liquid agent therein than the other.

Proximal to the first longitudinal end 102, the first chamber 108 can be shaped to have a narrowed, directed region 112 that defines a first sealed outlet port, and the second chamber 110 can be shaped to have a narrowed region 114 that defines a second sealed outlet port. In the illustrated example of FIG. 1A, the narrowed regions 112, 114 can be directed toward each other (e.g., angled inward toward a center of the BFS vial 100); however, other configurations or orientations are also possible according to one or more contemplated embodiments. Nevertheless, the first chamber 108 can remain isolated from the second chamber 110 by intervening portions of the BFS vial 100 (e.g., a flange formed by unmolded portions of fused parison), thereby preventing the first and second liquid agents from mixing in the sealed state.

Figure 1B:
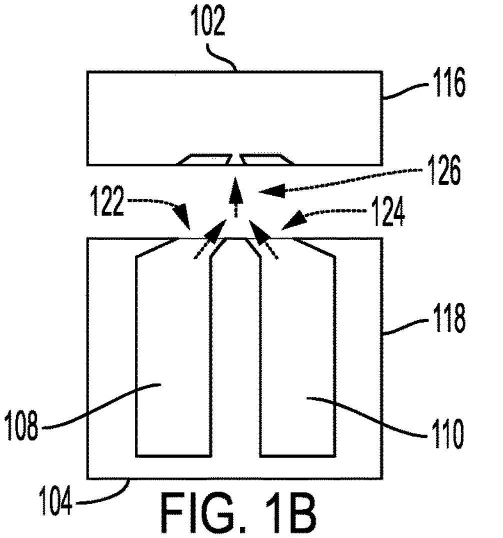

The narrowed regions 112, 114 can be disposed in a severable region 106 of the BFS vial 100, which region can be constructed to allow removal of a portion of the BFS vial 100 to provide access to the first and second chambers 108, 110. In some embodiments, the severable region 106 can comprise a frangible portion or a selectively weakened region (e.g., having a reduced thickness as compared to surrounding portions of the BFS vial). Appropriate application of a bending or tearing force can fracture the BFS vial 100 in the severable region 106, thereby separating breakaway portion 116 from remaining portion 118 of the BFS vial 100, as shown in FIG. 1B. Removal of the breakaway portion 116 can expose a first outlet 122 of the first chamber 108 and a second outlet 124 of the second chamber 124. In some embodiments, each chamber 108, 110 is a collapsible reservoir, such that application of a compression force thereto by an operator or user causes egress of the liquid agent from the chamber via the respective outlet. The contents of each chamber 108, 110 can thus flow in parallel from the respective outlet to a mixing region 126 external to the BFS vial 100 for administration to the patient (e.g., for topical, intranasal, intraoral, or other non-injectable administration). For example, an operator or user of the medical delivery system can separate the breakaway portion 116 in the field just prior to desired administration of the liquid agents contained in the BFS vial 100 to a patient. Accordingly, the liquid agents contained in each chamber 108, 110 can be kept separated and sealed (e.g., in sterile/aseptic state) until ready for administration.

Figure 3A:
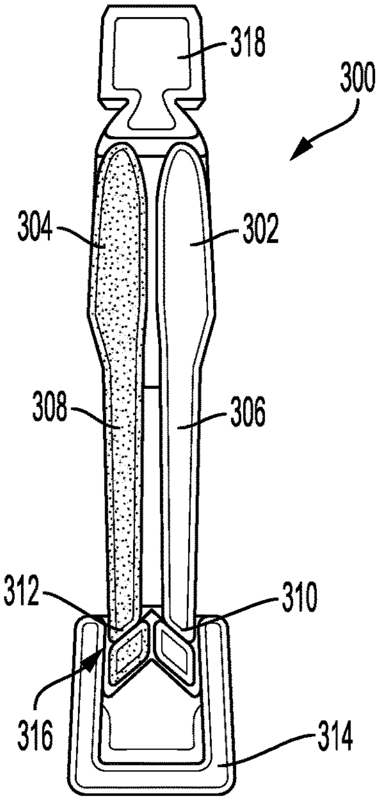
FIGS. 3A-3B illustrate front and perspective views of a first exemplary pre-filled medical delivery system that employs a breakaway portion to expose ports of a BFS vial for administration of combined liquid agents, according to one or more embodiments of the disclosed subject matter.
Figure 3B:
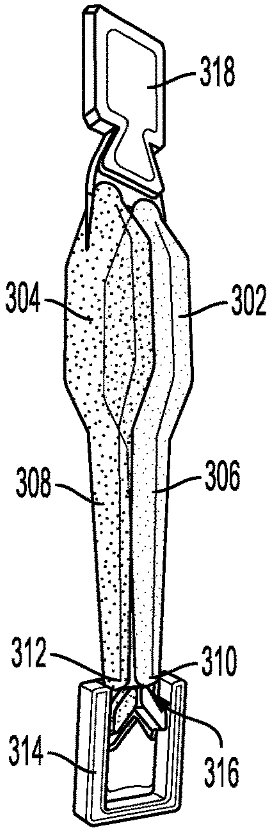
Figure 3C:
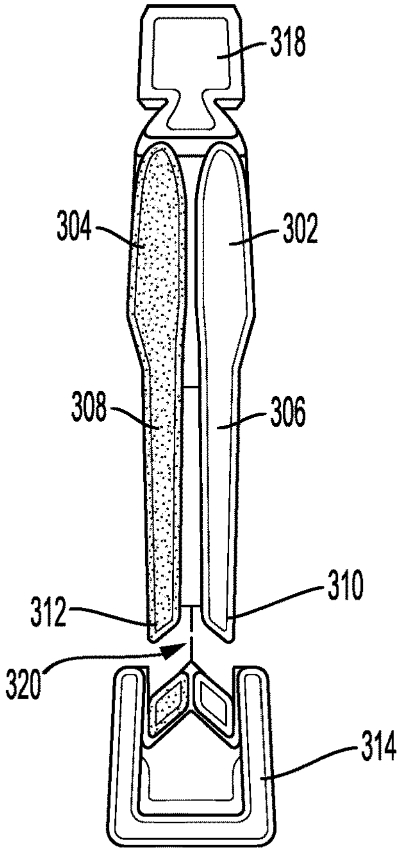
FIG. 3C illustrates a front view of the BFS vial of FIGS. 3A-3B after removal of the breakaway portion.

FIGS. 3A-3C illustrate another exemplary pre-filled medical delivery system employing a parallel configuration. The BFS vial 300 of the medical delivery system can comprise two distinct fluid chambers or reservoirs 302, 304, e.g., formed during a BFS manufacturing process. In the illustrated example, the reservoirs 302, 304 are symmetrically formed in a side-by-side configuration. The first reservoir 302 can contain a liquid agent different than that of the second reservoir 304. The BFS vial 300 can comprise a break-away portion 314 disposed at one longitudinal end. At a longitudinal end opposite to the break-away portion 314 and between the adjacent reservoirs 302, 304, the BFS vial 300 can comprise a flange 318 (e.g., formed by unmolded portions of fused parison). The break-away portion 314 can comprise a frangible or selectively weakened (e.g., thinner than the flange 318) portion 316 that is formed to be selectively removed from the BFS vial 300. A tapered or narrowing first conduit 306 can extend longitudinally from one end of the first reservoir 302 to the frangible portion 316, and a tapered or narrowing second conduit 308 can extend longitudinally from one end of the second reservoir 304 to the frangible portion 316.

When the frangible portion 316 is severed and the breakaway portion 314 is removed, openings 310, 312 are exposed at the ends of the first and second conduits 306, 308, respectively. Each reservoir 302, 304 can be a collapsible reservoir, such that application of a compression force thereto by an operator or user forces the liquid agent from the respective reservoir to travel down the respective tapered conduit 306, 308 and out of the respective opening 310, 312. The contents of each reservoir 302, 304 can thus flow in parallel from the respective opening for simultaneous administration to the patient (e.g., for topical, intranasal, intraoral, or other non-injectable administration). For example, an operator or user of the medical delivery system can separate the break-away portion 314 in the field just prior to desired administration of the liquid agents contained in the BFS vial 300 to a patient. Accordingly, the liquid agents contained in each reservoir 302, 304 can be kept separated and sealed (e.g., in sterile/aseptic state) until ready for administration.

Figure 2A:
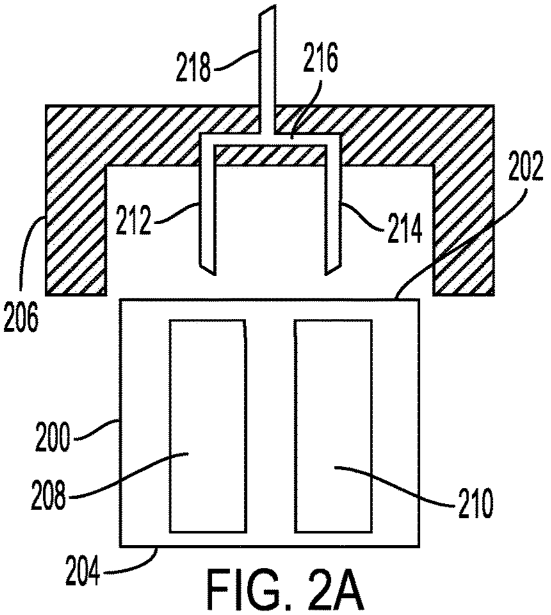
FIGS. 2A-2B are simplified schematic diagrams of a pre-filled medical delivery system prior to and after coupling of a first connection assembly to a BFS vial, respectively, for administration of combined liquid agents, according to one or more embodiments of the disclosed subject matter.
Figure 2B:
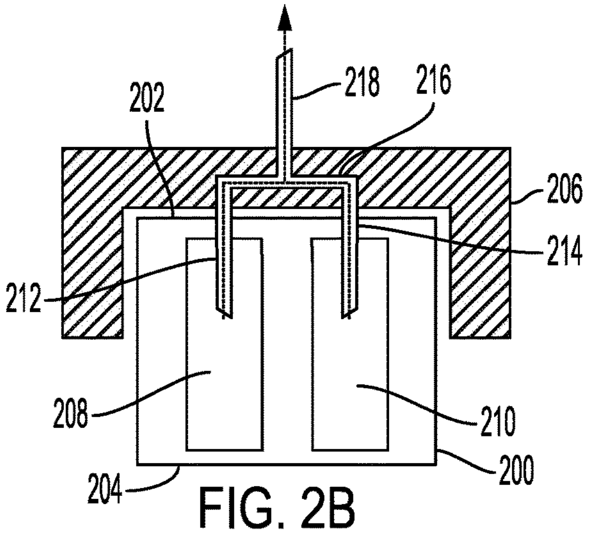

FIGS. 2A-2B illustrate another example of a pre-filled medical delivery system employing a parallel configuration. The BFS vial 200 of the medical delivery system can have a first longitudinal end 202 and an opposite second longitudinal end 204. The BFS vial 200 can also have a first chamber 208 containing a first liquid agent therein and a second chamber 210 containing a second liquid agent therein. In some embodiments, the first chamber 208 and the second chamber 210 are substantially the same volume and/or contain substantially the same volume of respective liquid agent therein. Alternatively, in some embodiments, one of the first and second chambers has a larger volume than the other, and/or one of the first and second chambers has a larger volume of respective liquid agent therein than the other. In the initial sealed state of FIG. 2A, the first chamber 208 is isolated from the second chamber 210 by intervening portions of the BFS vial 200 (e.g., a flange formed by unmolded portions of fused parison), thereby preventing the first and second liquid agents from mixing in the sealed state.

The medical delivery system can further include a connection assembly 206, which, in the initial sealed state of FIG. 2A is decoupled from the BFS vial 200. The connection assembly 206 can include a first piercing portion 212 and a second piercing portion 214. The first and second piercing portions 212, 214 can correspond to the first and second chambers 208, 210, respectively, and can be constructed to break through (e.g., breach) the portion of the vial 200 that extends between the first longitudinal end 202 and the respective chamber 208, 210. For example, each piercing portion 212, 214 can be a needle or cannula. To access the contents of the first and second chambers 208, 210, the connection assembly 206 can be coupled to the vial 200, such that the piercing portions 212, 214 extend through the portion of the vial 200 at the first end 202 (e.g., seal portion) into fluid communication with the chambers 208, 210, as shown in FIG. 2B. The piercing portions 212, 214 can be connected together by a laterally-extending bridge portion 216 (e.g., conduit), which in turn can be connected to an administration conduit 218 (e.g., a needle or cannula). In some embodiments, the piercing portions 212, 214 can be sized (e.g., diameter, length) different from each other and/or the bridge portion 216 can have a dimension that is non-uniform (e.g., cross-sectional size, length from piercing member to administration conduit), for example, to cause the liquid contents to be dispensed from their respective chambers at different rates upon actuation of the BFS vial.

In some embodiments, the administration conduit 218 connects to the bridge portion 216 at substantially a lateral midpoint thereof (e.g., equidistant flow paths from each of the first and second chambers 208, 210), as illustrated in the example of FIGS. 2A-2B. In other embodiments, the administration conduit 218 can connect to the bridge portion 216 at a location offset from a lateral midpoint thereof (e.g., a length of a flow path from one of the first and second chambers 208, 210 is greater than the other). In some embodiments, the piercing portions 212, 214, the bridge portion 216, and the administration conduit 218 can be different parts of a unitary structure (e.g., formed as a monolithic structure or formed from separate components joined together). For example, the unitary structure can be a branched needle structure formed in a bident or two-pronged pitch-fork configuration, or have an inverted Y-shape.

Figure 2C:
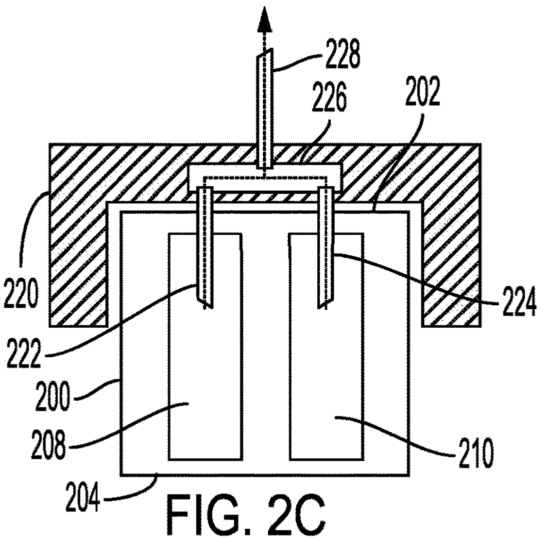
FIGS. 2C-2D are simplified schematic diagrams of pre-filled medical delivery systems employing second and third connection assemblies, respectively, for administration of combined liquid agents, according to one or more embodiments of the disclosed subject matter.

Alternatively, in some embodiments, the bridge portion 216 can be replaced by a laterally-extending mixing chamber 226 within the connection assembly 220, for example, as illustrated in FIG. 2C. In the illustrated example, the mixing chamber 226 has a substantially rectangular configuration in cross-sectional view. Alternatively, in some embodiments, the mixing chamber 226, alone or in combination with the piercing portions 222, 224 and the administration conduit 228, can have an inverted Y-shape in cross-sectional view. One of the piercing portions 222 can be disposed at one lateral end of the mixing chamber 226 and another of the piercing portions 224 can be disposed at an opposite lateral end of the mixing chamber 226. An administration conduit 228 can connect to the mixing chamber 226 at a longitudinal end thereof opposite to that of the piercing portions 222, 224. In some embodiments, the administration conduit 228 connects to the mixing chamber 226 at substantially a lateral midpoint thereof (e.g., equidistant flow paths from each of the first and second chambers 208, 210), as illustrated in the example of FIG. 2C. In other embodiments, the administration conduit 228 can connect to the mixing chamber 226 at a location offset from a lateral midpoint thereof (e.g., a length of a flow path from one of the first and second chambers 208, 210 is greater than the other). In some embodiments, the provision of mixing chamber 226 can allow the liquid agents from the respective chambers 208, 210 to mix more thoroughly prior to entering the administration conduit 228. Additionally, in some embodiments, the mixing chamber 226 can include features (e.g., baffles) to further promote mixing between the liquid agents flowing therein.

Figure 2D:
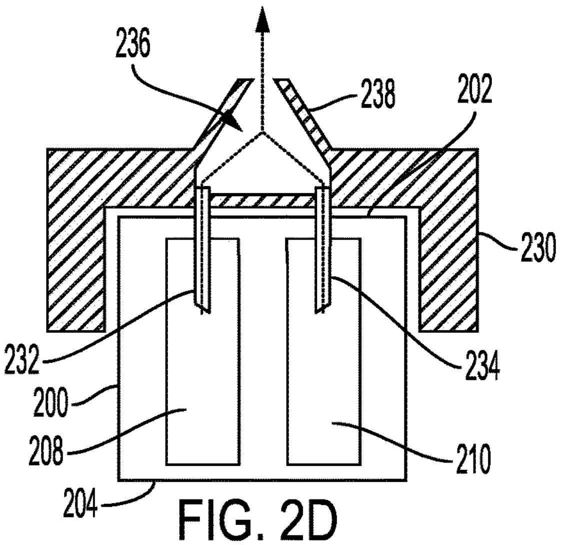

Alternatively, in some embodiments, the administration conduit 228 can be replaced by a nozzle 238, as illustrated with connection assembly 230 in FIG. 2D. One of the piercing portions 232 can be disposed at one lateral end of internal volume 236 of nozzle 238 and another of the piercing portions 234 can be disposed at an opposite lateral end of the internal volume 236. In some embodiments, the nozzle 238 can be positioned at substantially a lateral midpoint between the piercing portions 232, 234 (e.g., equidistant flow paths from each of the first and second chambers 208, 210), as illustrated in the example of FIG. 2D). In other embodiments, the nozzle 238 can be positioned at a location offset from the lateral midpoint between the piercing portions 232, 234 (e.g., a length of a flow path from one of the first and second chambers 208, 210 is greater than the other). In some embodiments, the nozzle 238 is configured as a spray nozzle or a droplet nozzle.

In some embodiments, each chamber 208, 210 can be a collapsible reservoir, such that application of a compression force thereto by an operator or user causes egress of the liquid agent from the chamber via the respective piercing portion. In the example of FIG. 2B, the contents of each chamber 208, 210 can thus flow in parallel, via piercing portions 212, 214 and bridge portion 216, to administration conduit 218 for administration to the patient. In the example of FIG. 2C, the contents of each chamber 208, 210 can thus flow in parallel, via piercing portions 222, 224 and mixing chamber 226, to administration conduit 228 for administration to the patient. In the example of FIG. 2D, the contents of each chamber 208, 210 can thus flow in parallel, via piercing portions 232, 234 and internal volume 236, to nozzle 238 for administration to the patient. For example, an operator or user of the medical delivery system can couple the connection member to the BFS vial 200 in the field just prior to desired administration of the liquid agents contained in the BFS vial 200 to a patient. Accordingly, the liquid agents contained in each chamber 208, 210 can be kept separated and sealed (e.g., in sterile/aseptic state) until ready for administration.

Figure 4A:
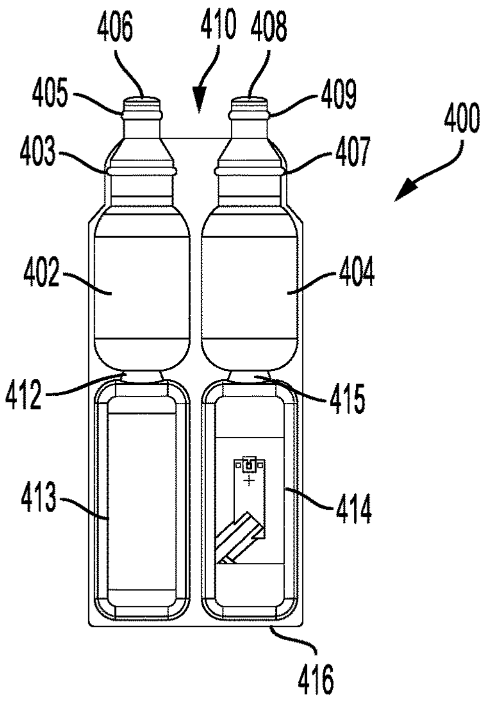
FIG. 4A illustrates a front view of a BFS vial of a second exemplary pre-filled medical delivery system for administration of combined liquid agents, according to one or more embodiments of the disclosed subject matter.
Figure 4B:
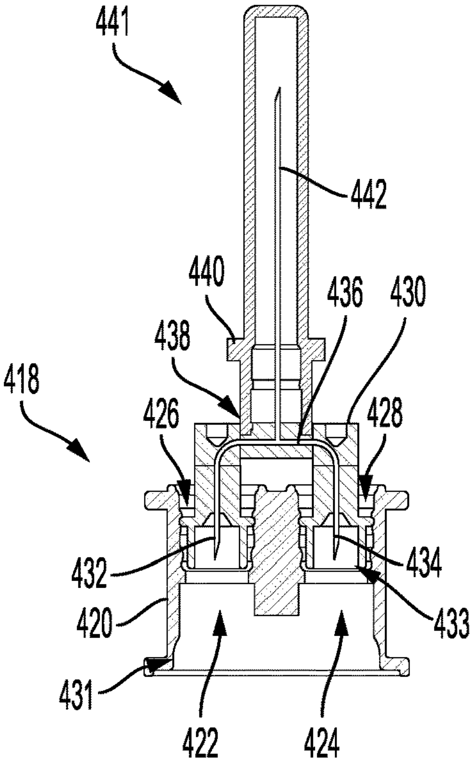
FIG. 4B is a cross-sectional view of a connection assembly of the second exemplary pre-filled medical delivery system, for use with the BFS vial of FIG. 4A.
Figure 4C:
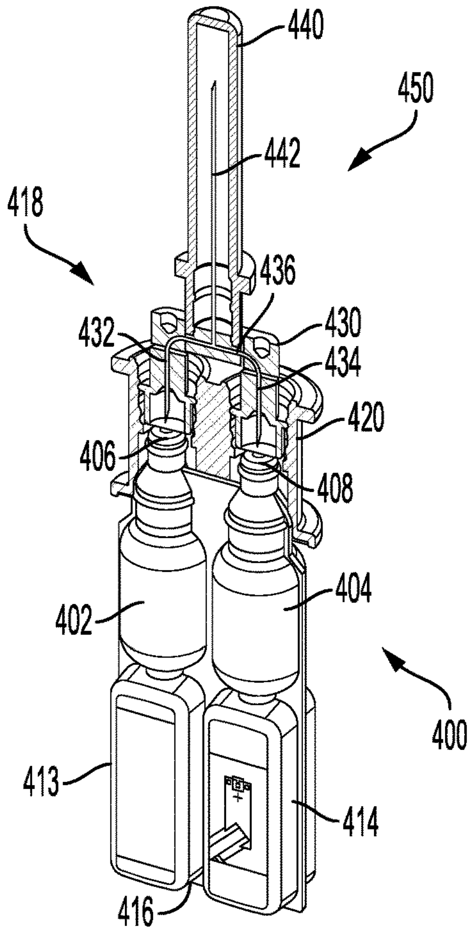
FIG. 4C is a perspective view (with partial cut-away) of the connection assembly of FIG. 4B partially coupled to the BFS vial of FIG. 4A to form the second exemplary pre-filled medical delivery system.

FIGS. 4A-4C illustrate another exemplary pre-filled medical delivery system employing a parallel configuration. In some embodiments, the pre-filled medical delivery system or assembly 450 may comprise various inter-connected and/or modular components. In some embodiments, some or all of the various components can be provided in an unassembled state as a kit, for example, for assembly in the field and/or at a time just prior to administration. In the illustrated example, the pre-filled medical delivery system 450 (as shown in FIG. 4C) includes a BFS vial 400 (as shown in FIGS. 4A and 4C) and a connection assembly 418 (as shown in FIGS. 4B and 4C). In some embodiments, the pre-filled medical delivery system 450, or the kit for forming system 450, can include additional components beyond those specifically illustrated in FIGS. 4A-4C. In some embodiments, the components of the kit, e.g., the BFS vial 400 and the connection assembly 418 can be manufactured, packaged, shipped, stored, and/or provided as separate components. In such a manner, the connection assembly 418 may not need to be stored or shipped in accordance with often restrictive requirements imposed on medicaments and may accordingly reduce the amount of space required for such specialized storage and/or shipping. The connection assembly 418 may also or alternatively be manufactured, stored, and/or shipped in advance (e.g., at a first time) while the BFS vial 400 that is pre-filled with the liquid agents may be manufactured, stored, and/or shipped at a later time (e.g., a second time). In some embodiments, the delay between the first time and the second time may be lengthy without causing detrimental effects, as the connection assembly 418 may be stored, in some embodiments, indefinitely. In such a manner, units of the connection assembly 418 may be provided to be on-hand in advance of the availability and/or arrival of the BFS vial 400, reducing supply chain constraints in the case of proactive connection assembly 418 procurement. Thus, unassembled components of pre-filled medical delivery system kits according to embodiments of the disclosed subject matter need not be provided together in the same package or at the same time.

Referring to FIG. 4A, the BFS vial 400 can comprise and/or define a first vial neck 405 (e.g., cylindrical neck with one or more mounting flanges), a second vial neck 409 (e.g., cylindrical neck with one or more mounting flanges), a first mounting flange 403, a second mounting flange 407, a first fluid chamber 402, a second fluid chamber 404, a first fluid seal 406 (e.g., a sealed outlet port for chamber 402), and a second fluid seal 408 (e.g., a sealed outlet port for chamber 404). In some embodiments, the BFS vial 400 can further include a third chamber 413 (with or without a liquid agent therein) coupled to the first fluid chamber 402 via a narrowed flow path, juncture, valve, or constriction 412, and a fourth chamber 414 (with or without a liquid agent therein) coupled to the second fluid chamber 404 via a narrowed flow path, juncture, valve, or constriction 415. In such embodiments, the first and second fluid chambers 402, 404 can be constructed as dispensing reservoirs, and the third and fourth chambers 413, 414 can be constructed as collapsible reservoirs. The liquid agent may generally pass between the collapsible reservoirs and the connected dispensing reservoirs. In some embodiments, the constriction between the dispensing reservoir and the corresponding collapsible reservoir may restrict flow such that the liquid agent may readily enter one of the dispensing and collapsible reservoirs but may not readily return to the other reservoir. Alternatively, in some embodiments, the constriction may not be necessary or desirable, such as in the case that the collapsible reservoir and the dispensing reservoir are formed and/or combined as a single reservoir. Alternatively or additionally, the first fluid chamber 402, the second fluid chamber 404, the third chamber 413, and the fourth chamber 414 can each be constructed as collapsible reservoirs.

As shown in FIG. 4A, the first fluid chamber 402 and the second fluid chamber 404 can be arranged side-by-side and can be filled (partially or fully) with a respective liquid agent. In some embodiments, the liquid agent can be injected into respective fluid chamber 402, 404 in a sterile environment during manufacture via a BFS process and sealed within the BFS vial 400 via first and second fluid seals 406, 408 at the respective outlet ports. Each fluid seal 406, 408 may comprise a portion of the molded BFS vial 400, for example, that is configured to be pierced to expel the liquid agent. Alternatively or additionally, in some embodiments, each fluid seal 406, 408 can comprise a foil, wax, paper, and/or other thin, pierceable object or layer coupled to the BFS vial 400.

Referring to FIG. 4B, the connection assembly 418 can comprise and/or define a coupling base member 420, a bridge member 430, and/or an administration assembly 441. In some embodiments, the bridge member 430 and/or the administration assembly 441 can be formed separate from the coupling base member 420 and subsequently coupled thereto, e.g., assembled in the field. Alternatively, in some embodiments, at least two of the bridge member 430, the administration assembly 441, and the coupling base member 420 can be coupled together at the time of manufacturing and provided in the kit as a single piece. Alternatively, in some embodiments, at least two of the bridge member 430, the administration assembly 441, and the coupling base member 420 can be formed as a single piece, for example, with the structures of the coupling base member 420 integrated with the structures of the bridge member 430 without a delineation therebetween.

In the illustrated example of FIG. 4B, the coupling base member 420 can define a first socket 422 and a second socket 424 at a first longitudinal end, and a third socket 426 and a fourth socket 428 at a second longitudinal end. The first socket 422 can be constructed to receive the first vial neck 405 and the first mounting flange 403 of the BFS vial 400 therein, while the second socket 424 can be constructed to receive the second vial neck 409 and the second mounting flange 407 of the BFS vial 400 therein. The first socket 422 can be in fluid communication (e.g., defining a through-hole) with the third socket 426 such that, when the coupling base member 420 is coupled to the first longitudinal end 410 of the BFS vial, at least the first vial neck 405 (e.g., seal 406) can interact with the portion of the bridge member contained in third socket 426. Similarly, the second socket 424 can be in fluid communication with the fourth socket 428 such that, when the coupling base member 420 is coupled to the first longitudinal end 410 of the BFS vial, at least the second vial neck 409 (e.g., seal 408) can interact with the portion of the bridge member contained in fourth socket 428.

The bridge member 430 can have a pair of coupling or receiving ports with a respective piercing member 432, 434 therein. The piercing members 432, 434 are connected at opposite ends of a laterally-extending bridge conduit 436. An administration conduit 442 is connected to a lateral midpoint of the bridge conduit 436 (e.g., forming a three-way junction) and extends in a direction therefrom opposite to that of the piercing members 432, 434. A separate cap or cover 440 can be provided over the administration conduit 442 and releasably coupled to a support hub thereof and/or a portion of bridge member 430, for example, to protect the administration conduit 442 from damage and/or contamination until ready for use in administering the combined liquid agents to a patient. In the illustrated example of FIG. 4B, the piercing members 432, 434, the bridge conduit 436, and the administration conduit 442 are formed as an integral structure, for example, a branched needle or branched cannula having a bident or dual-prong pitchfork configuration. Alternatively, in some embodiments, the bridge conduit 436 alone, or in combination with the piercing members 432, 434 and the administration conduit 442, can have an inverted Y-shape. In some embodiments, the administration conduit 442 is adapted for subcutaneous, intramuscular, intradermal, and intravenous injection. For example, the administration conduit 442 can have a length (e.g., as measured between a top longitudinal end of the bridge member 430 and an outlet end of the administration conduit 442 remote from the bridge member 430) in a range of 0.5 mm to 4 mm, inclusive, or in a range of 4 mm to 15 mm, inclusive, or in a range of 15 mm to 30 mm, inclusive.

To assemble the delivery system 450 in preparation for administration of the liquid agents to a patient, the first longitudinal end 410 of the BFS vial 400 can be inserted into the connection assembly 418, with the first and second mounting flanges 403, 407 being received in sockets 422, 424, respectively, as shown in FIG. 4C. Each socket 422, 424 may comprise and/or define (e.g., on or in an interior surface thereof) a shaped seat or a narrow-diameter region that is configured to interact with the respective mounting flange 403, 407 to retain the BFS vial 400 in the inserted configuration (or at least resist removal of the BFS vial 400 from the connection assembly 418 once inserted). Alternatively or additionally, a portion of the flange surrounding the first and second fluid chambers 402, 404 can interact with a surrounding sidewall 431 of the coupling base member 420 to retain the BFS vial 400 in the inserted configuration. Alternatively or additionally, each coupling port of the bridge member 430 (e.g., on or in an interior surface thereof, for example, at 433) may comprise and/or define a shaped seat or a narrow-diameter region that is configured to interact with a mounting flange of the respective vial neck 405, 409 to retain the BFS vial 400 in the inserted configuration (or at least resist removal of the BFS vial 400 from the connection assembly 418 once inserted). Any or all of the interactions between the connection assembly 418 and the BFS vial 400 to retain the BFS vial 400 in the inserted configuration can comprise an engineering fit, such as a snap-fit, location fit, interference fit, or the like.

In some embodiments, the connection assembly 418 may be engaged to couple with the BFS vial 400, or vice versa, via application of a mating longitudinal force (e.g., in a direction substantially parallel to a longitudinal dimension of the vial 400 between its first end 410 and its second end 416). As depicted in FIG. 4C, for example, the vial necks 405, 409 of the BFS vial 400 may be urged and/or forced into the respective sockets 422, 424 until the vial necks 405, 409 become seated in (and/or coupled to or mated with) the coupling ports of the bridge member 430 within sockets 426, 428 of the connection assembly 418. In some embodiments, the BFS vial 400 may be engaged with connection assembly 418 in two positions or stages. In a first stage or position (e.g., a transport and/or storage stage or position) as depicted, for example, in FIG. 4C, the BFS vial 400 can be partially inserted into the connection assembly 418 such that the fluid seals 406, 408 are positioned adjacent to and/or aligned with the piercing members 432, 434. In a second stage or position (not shown; e.g., an activation stage or position), the BFS valve 400 may be fully inserted into the connection assembly 418 such that piercing elements breach (e.g., pierce, tear, or otherwise extend through) the respective seals 406, 408, thereby providing for fluid communication between the contents of fluid chambers 402, 404, and the administration conduit 442.

Actuation of the BFS vial 400 (e.g., by applying a compressive force to the first and second fluid chambers 402, 404, and/or by applying a compressive force to the third and fourth chambers 413, 414 when the BFS vial is so equipped) forces the liquid agent contained in the first and second fluid chambers 402, 404 to flow therefrom into the bridge member 430, in particular bridge conduit 436, via the respective piercing members 432, 434. Within the bridge conduit 436, the liquid agents from the first and second fluid chambers 402, 404 can join, mix, and/or otherwise combined prior to or concurrent with introduction into the administration conduit 442. The pressure generated by actuation of the BFS vial 400 can further cause the combined liquid agents to progress downstream through the administration conduit 442 out of an outlet end thereof (and, e.g., into a patient, not shown).

Although FIGS. 4A-4C illustrate specific components and features thereof, embodiments of the disclosed subject matter are not limited thereto. Rather, fewer or additional components than illustrated components 400-442 can be included in the pre-filled medical delivery system 450 according to one or more contemplated embodiments. Moreover, various configurations of illustrated components 400-442 can be included in the pre-filled medical delivery system 450 without deviating from the scope of embodiments described herein. In some embodiments, the components 400-442 may be similar in configuration and/or functionality to similarly named and/or numbered components as described herein.

Figure 5:
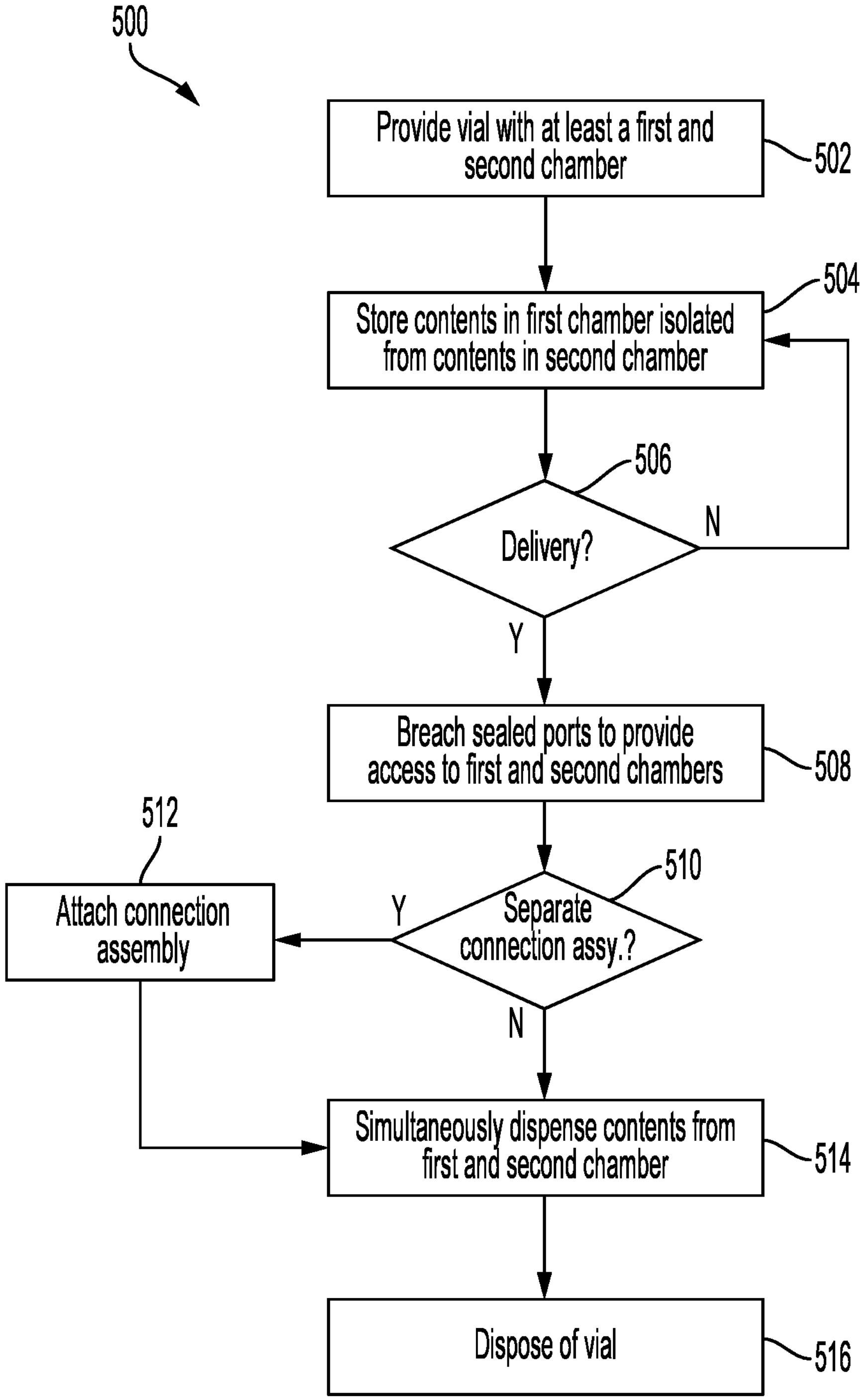
FIG. 5 is a process flow diagram of an exemplary method for assembly and use of a pre-filled medical delivery system for administration of combined liquid agents, according to one or more embodiments of the disclosed subject matter.

III. Method Examples for Administering a Medical Treatment Using Parallel System Configurations FIG. 5 illustrates an exemplary method 500 for administering a medical treatment using a pre-filled medical treatment system having a parallel configuration. The method 500 can initiate at process block 502, where a vial (e.g., a BFS vial) having at least two chambers separately storing respective liquid agents therein is provided. For example, the vial can be similar to any of the vials described above with the respect to FIGS. 1A-4C. In some embodiments, the provision of process block 502 can include manufacturing the vial with the liquid agents sealed therein, for example, using a BFS manufacturing technique.

The method 500 can proceed to process block 504, where the liquid agent contained in a first chamber of the vial is stored isolated from the liquid agent contained in a second chamber of the vial. In some embodiments, the storing of process block 504 can include providing appropriate environment conditions (e.g., a temperature at or below room temperature (e.g., 20-22° C.) for the vial to maintain viability of the liquid agents contained therein. For example, the vial can be maintained in an as-manufactured sealed configuration, with the contents of the first and second chambers separated from each other and the environment until combination of the separate liquid agents is desired (e.g., just prior to administration to a patient), as determined at decision block 506.

If administration of the liquid agents is desired at decision block 506, the method 500 can proceed to process block

508; otherwise, the method 500 returns to process block 504 to maintain the vial in a sealed state. At process block 508, the contents of the first and second chambers can be accessed, for example, by breaching sealed ports in fluid communication with the first and second chambers. In some embodiments, the breaching of process block 504 can be performed manually (e.g., by pulling offing, tearing, or otherwise removing a sealing portion) or by using a separate tool (e.g., a nail, pin, needle, or other piercing tool). Alternatively, in some embodiments, the breaching of process block 504 can be performed by using a connection assembly. In some embodiments, the connection assembly can breach the sealed ports of the vial as well provide fluid communication between the breached ports and an administration conduit (which may be part of the connection assembly or a separate component coupled thereto). For example, the connection assembly can be similar to any of the connection assemblies described above with respect to FIGS. 2A-2D and 4A-4C.

The method 500 can proceed to decision block 510, where it is determined if coupling of a connection assembly to the vial is necessary. For example, when the breaching of process block 508 was performed manually or by using a separate tool, the method 500 can proceed from decision block 510 to process block 512, where a connection assembly can be coupled to the vial in order to provide fluid communication between the previously breached ports and an administration conduit (which may be part of the connection assembly or a separate component coupled thereto). For example, the connection assembly can be similar to any of the connection assemblies described above with respect to FIGS. 2A-2D and 4A-4C. Alternatively, when the breaching of process block 508 was performed using a connection assembly that remains coupled to the vial, the method 500 can proceed from decision block 510 to process block 514.

At process block 514, the vial can be actuated in order to administer combined liquid agents from the first and second chamber to a patient. For example, the first and second chambers (or collapsible reservoirs serially connected thereto) can be compressed to simultaneously dispense the liquid agents contained therein into the connection assembly, where the liquid agents combine en route to the administration conduit. The pressure generated by the actuation of the vial can further cause the combined liquid agents to flow through the administration conduit to an outlet end thereof (e.g., a needle tip) where it is administered to a patient. In some embodiments, the administration conduit can comprise a needle, and the simultaneously dispensing of process block 514 can include inserting an outlet end of the needle into the patient, for example, to effect a subcutaneous, intramuscular, intradermal, and intravenous injection of the combined liquid agents. Alternatively, in some embodiments, the administration conduit can comprise a nozzle, and the simultaneously dispensing of process block 514 can include inserting an outlet end of the nozzle into an orifice or cavity of the patient (e.g., oral, nasal, ear canal, etc.) or disposing adjacent to an exposed surface of the patient (e.g., for topical application, eyes, etc.) In some embodiments, the dispensing of combined liquid agents of process block 514 is effective to a deliver a single dose of a therapeutic agent to the patient, for example, having a volume of 1 ml or less (e.g., 0.5 ml to 0.75 ml, inclusive). After administration, the administration conduit can be removed from the patient.

The method 500 can proceed to process block 516, where some or all of the components of the pre-filled medical treatment system can be disposed. For example, the vial can be constructed for single use and may be incapable of (or at least undesirable for) reuse once the seals are breached and the liquid agents are dispensed therefrom. In some embodiments, the connection assembly can also be constructed for single use and may be discarded after the administration. Alternatively, in some embodiments, the connection assembly or parts thereof (e.g., coupling base member 420, bridge member 430, and/or cover 440) can be retained for reuse, for example, by appropriate cleaning and/or sterilization techniques.

Although some of blocks 502-516 of method 500 have been described as being performed once, in some embodiments, multiple repetitions of a particular process block may be employed before proceeding to the next decision block or process block. In addition, although blocks 502-516 of method 500 have been separately illustrated and described, in some embodiments, process blocks may be combined and performed together (simultaneously or sequentially). Moreover, although FIG. 5 illustrates a particular order for blocks 502-516, embodiments of the disclosed subject matter are not limited thereto. Indeed, in certain embodiments, the blocks may occur in a different order than illustrated or simultaneously with other blocks.

IV. Serial Configuration Examples for Pre-Filled Medical Delivery Systems

In some embodiments, the pre-filled medical delivery system is constructed to deliver liquid agents from respective chambers of the BFS vial in series (e.g., with respect to a fluid dispensing path) for administration to the patient. For example, FIGS. 6A-6D illustrate an example of a pre-filled medical delivery system employing a serial configuration. The BFS vial 600 of the medical delivery system can have a first longitudinal end 604 and an opposite second longitudinal end 602. The BFS vial 600 can also have a first chamber 608 containing a first liquid agent therein and a second chamber 610 containing a second liquid agent therein. In some embodiments, the first chamber 608 and the second chamber 610 are substantially the same volume and/or contain substantially the same volume of respective liquid agent therein. Alternatively, in some embodiments, one of the first and second chambers has a larger volume than the other, and/or one of the first and second chambers has a larger volume of respective liquid agent therein than the other. In the initial sealed state of FIG. 6A, the first chamber 608 is isolated from the second chamber 610 by intervening portions of the BFS vial 600 (e.g., a flange formed by unmolded portions of fused parison), thereby preventing the first and second liquid agents from mixing in the sealed state.

Figure 6A:
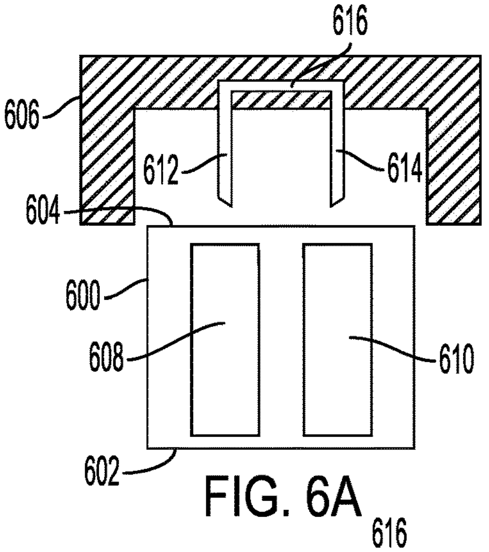
FIGS. 6A-6B are simplified schematic diagrams of a pre-filled medical delivery system prior to and after coupling of a fourth connection assembly to a BFS vial, respectively, according to one or more embodiments of the disclosed subject matter.
Figure 6B:
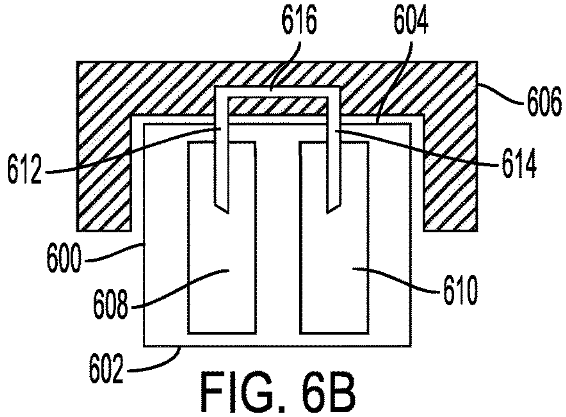

The medical delivery system can further include a connection assembly 606, which, in the initial sealed state of FIG. 6A is decoupled from the BFS vial 600. The connection assembly 606 can include a first piercing portion 612 and a second piercing portion 614. The first and second piercing portions 612, 614 can correspond to the first and second chambers 608, 610, respectively, and can be constructed to break through (e.g., breach) the portion of the vial 600 that extends between the first longitudinal end 604 and the respective chamber 608, 610. For example, each piercing portion 612, 614 can be a needle or cannula. To access the contents of the first and second chambers 608, 610, the connection assembly 606 can be coupled to the vial 600, such that the piercing portions 612, 614 extend through the portion of the vial 600 at the first end 604 (e.g., first and second seal portions) into fluid communication with the chambers 608, 610, as shown in FIG. 6B. The piercing portions 612, 614 can be connected together by a laterally-extending bridge portion 616 (e.g., conduit). In some embodiments, the piercing portions 612, 614, and the bridge portion 616 can be different parts of a unitary structure (e.g., formed as a monolithic structure or formed from separate components joined together). For example, the unitary structure can be a double-ended needle structure formed in an inverted U-shape or V-shape configuration.

Figure 6C:
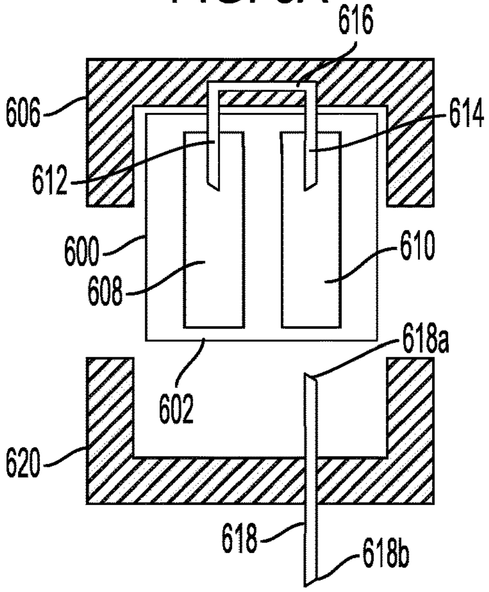
FIGS. 6C-6D are simplified schematic diagrams of the pre-filled delivery system of FIG. 6B prior to and after coupling of an administration assembly to the BFS vial, respectively, for administration of combined liquid agents.
Figure 6D:
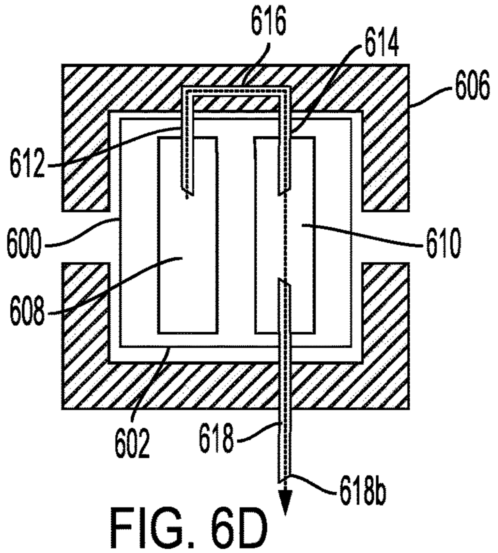
Figure 6E:
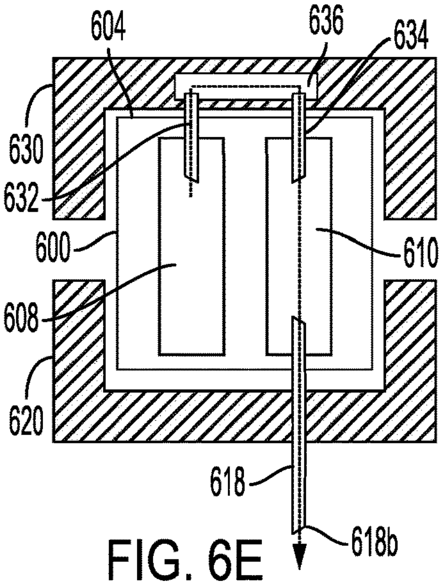
FIG. 6E is a simplified schematic diagram of a pre-filled medical delivery system employing a fifth connection assembly, according to one or more embodiments of the disclosed subject matter.

Alternatively, in some embodiments, the bridge portion 616 can be replaced by a laterally-extending chamber 636 within the connection assembly 630, for example, as illustrated in FIG. 6E. In the illustrated example, the chamber 636 has a substantially rectangular configuration in cross-sectional view. Alternatively, in some embodiments, the chamber 636, alone or in combination with the piercing portions 632, 634, can have an inverted U-shape or V-shape in cross-sectional view. One of the piercing portions 632 can be disposed at one lateral end of the chamber 636 and another of the piercing portions 634 can be disposed at an opposite lateral end of the chamber 636.

The medical delivery system can further include an administration assembly 620, which can initially be decoupled from the BFS vial 600, as shown in FIG. 6C. The administration assembly 620 can include an administration conduit 618 having an inlet end 618*a* and an outlet end 618*b*. The inlet end 618*a* of the administration conduit 618 can correspond to one of the chambers of the BFS vial 600, for example, second chamber 610 in the illustrated example of FIG. 6C. The inlet end 618*a* can be constructed to break through (e.g., breach) the portion of the vial 600 that extends between the second longitudinal end 602 and the second chamber 610. For example, administration conduit 618 can be a needle or cannula. To access the contents of the second chamber 610, the administration assembly 620 can be coupled to the vial 600, such that the inlet end 618*a* of the administration conduit 618 extends through the portion of the vial 600 at the second end 602 (e.g., third seal portion) into fluid communication with chamber 610, as shown in FIG. 6D.

In some embodiments, each chamber 608, 610 can be a collapsible reservoir, such that application of a compression force thereto by an operator or user causes egress of the liquid agent from the chamber via the respective piercing portion. In the example of FIG. 6D, the first chamber 608 can be actuated to first dispense the liquid agent contained therein into the second chamber 610 via the connection assembly 606. The first liquid agent can thus join, mix, or otherwise combine with the second liquid agent contained in the second chamber 610. After the combination, the second chamber 610 can then be actuated to dispense the combined liquid agents from the second chamber 610 into administration conduit 618 for administration to the patient. For example, an operator or user of the medical delivery system can couple the connection assembly 606 and/or the administration assembly 620 to the BFS vial 600 just prior to desired administration of the liquid agents contained in the BFS vial 600 to a patient. Accordingly, the liquid agents contained in each chamber 608, 610 can be kept separated and sealed (e.g., in sterile/aseptic state) until ready for administration.

Figure 6F:
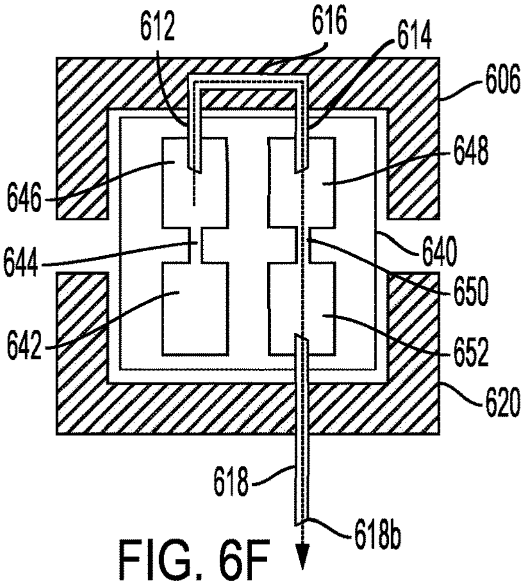
FIG. 6F is a simplified schematic diagram of a pre-filled medical delivery system employing a BFS vial having more than two chambers, according to one or more embodiments of the disclosed subject matter.

In some embodiments, the BFS vial can contain more than two chambers, for example, to contain additional liquid agents, to provide additional space for serial combination of previously separate liquid agents, and/or to be used for actuation to dispense contents from another fluid chamber. For example, FIG. 6F illustrates a BFS vial 640 that has a first and second fluid chambers 646, 648, each containing a liquid agent therein, and third and fourth chambers 642, 652, which may or may not have any liquid agent therein. The third chamber 642 can be connected to the first fluid chamber 646 by a narrowed flow path or constriction 644, for example, to resist backflow of fluid into the third chamber 642 during actuation thereof. The fourth chamber 652 can be connected to the second fluid chamber 648 by another narrowed flow path or constriction 650, for example, to resist backflow of fluid into the second chamber 648 during actuation thereof. In an exemplary operation, a compression force can be applied to the third chamber 642, which in turn applies pressure to the first chamber 646 to cause the liquid agent therein to be dispensed to the second chamber 648 via the connection assembly 606. The first liquid agent can thus join, mix, or otherwise combine with the second liquid agent contained in the second chamber 610. After the combination, a compression force can be applied to the first fluid chamber 646 (and, in some embodiments, the third chamber 642 as well), which in turn applies pressure to the second chamber 648 to cause transfer of the combined liquid agents therein to the fourth chamber 652 via constriction 650. After the transfer, a compression force can be applied to the second fluid chamber 648 (and, in some embodiments, the first fluid chamber 646 and/or third chamber 642 as well), which in turn applies pressure to the third chamber 652 to dispense the combined liquid agents into the administration conduit 618 for administration to the patient.

Figure 7A:
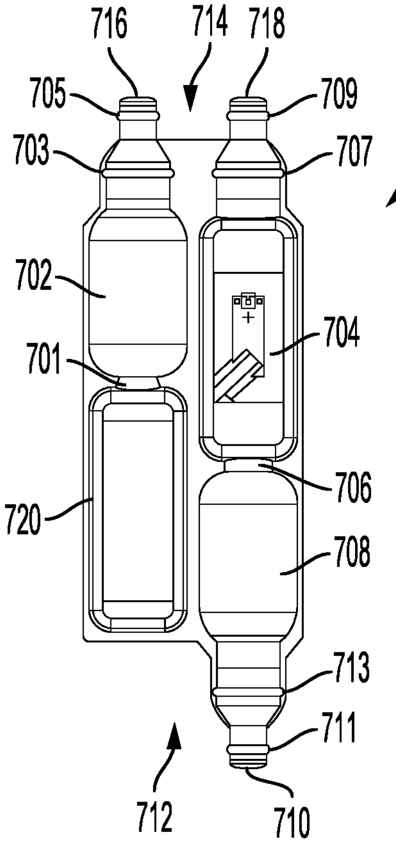
FIG. 7A illustrates a front view of a BFS vial of a third exemplary pre-filled medical delivery system for administration of combined liquid agents, according to one or more embodiments of the disclosed subject matter.
Figure 7B:
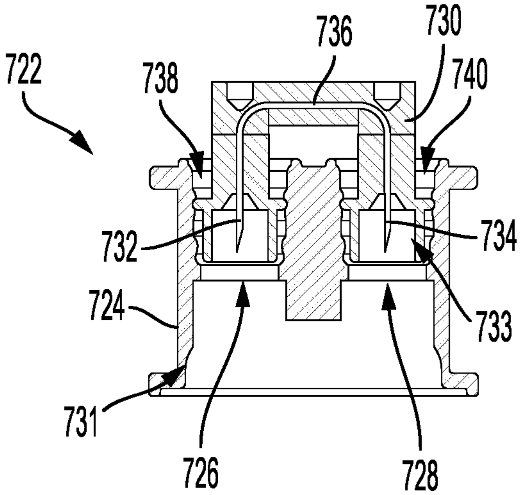
FIG. 7B is a cross-sectional view of a connection assembly of the third exemplary pre-filled medical delivery system, for use with the BFS vial of FIG. 7A.
Figure 7C:
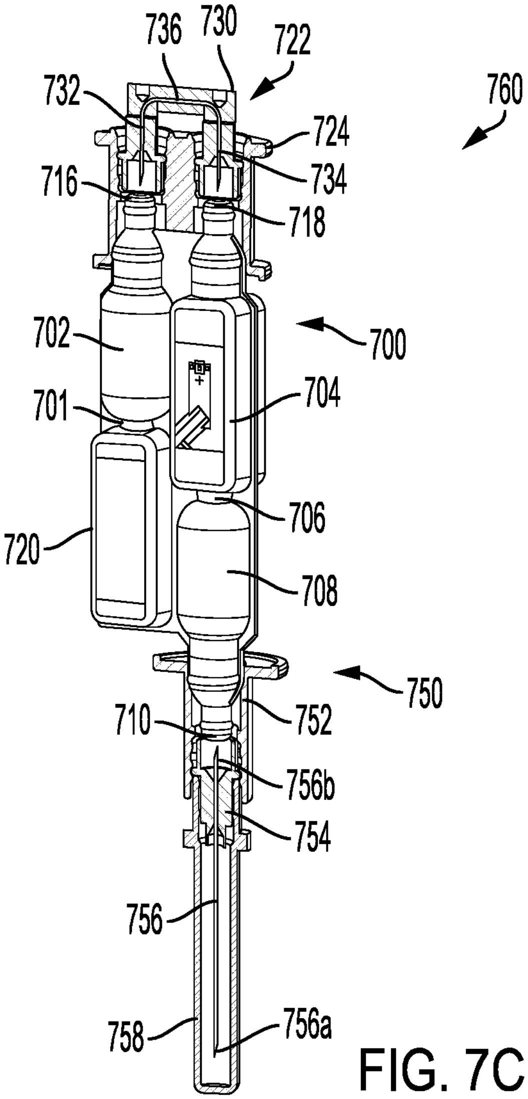
FIG. 7C is a perspective view (with partial cut-away) of the connection assembly of FIG. 7B partially coupled to the BFS vial of FIG. 7A and an administration assembly partially coupled to the BFS vial of FIG. 7A, to form the third exemplary pre-filled medical delivery system.

FIGS. 7A-7C illustrate another exemplary pre-filled medical delivery system employing a parallel configuration. In some embodiments, the pre-filled medical delivery system or assembly 760 may comprise various inter-connected and/or modular components. In some embodiments, some or all of the various components can be provided in an unassembled state as a kit, for example, for assembly in the field and/or at a time just prior to administration. In the illustrated example, the pre-filled medical delivery system 760 (as shown in FIG. 7C) includes a BFS vial 700 (as shown in FIGS. 7A and 7C), a connection assembly 722 (as shown in FIGS. 7B and 7C), and an administration assembly 750 (as shown in FIG. 7C). In some embodiments, the pre-filled medical delivery system 760, or the kit for forming system 760, can include additional components beyond those specifically illustrated in FIGS. 7A-7C. In some embodiments, the components of the kit, e.g., the BFS vial 700, the connection assembly 722, and/or the administration assembly 750 can be manufactured, packaged, shipped, stored, and/or provided as separate components. In such a manner, the connection assembly 722 and/or the administration assembly 750 may not need to be stored or shipped in accordance with often restrictive requirements imposed on medicaments and may accordingly reduce the amount of space required for such specialized storage and/or shipping. The connection assembly 722 and/or the administration assembly 750 may also or alternatively be manufactured, stored, and/or shipped in advance (e.g., at a first time) while the BFS vial 700 that is pre-filled with the liquid agents may be manufactured, stored, and/or shipped at a later time (e.g., a second time). In some embodiments, the delay between the first time and the second time may be lengthy without causing detrimental effects, as the connection assembly 722 and/or the administration assembly 750 may be stored, in some embodiments, indefinitely. In such a manner, units of the connection assembly 722 and/or the administration assembly 750 may be provided to be on-hand in advance of the availability and/or arrival of the BFS vial 700, reducing supply chain constraints in the case of proactive procurement of the connection assembly 722 and/or the administration assembly 750. Thus, unassembled components of pre-filled medical delivery system kits according to embodiments of the disclosed subject matter need not be provided together in the same package or at the same time.

Referring to FIG. 7A, the BFS vial 700 can comprise and/or define a first vial neck 705 (e.g., cylindrical neck with one or more mounting flanges), a second vial neck 709 (e.g., cylindrical neck with one or more mounting flanges), a third vial neck 711 (e.g., cylindrical neck with one or more mounting flanges), a first mounting flange 703, a second mounting flange 707, a third mounting flange 713, a first fluid chamber 702, a second fluid chamber 704, a third chamber 708, a first fluid seal 716 (e.g., a sealed outlet port for chamber 702), a second fluid seal 718 (e.g., a sealed inlet port for chamber 704), and a third fluid seal 710 (e.g., a sealed outlet port for chamber 708). In some embodiments, the BFS vial 700 can further include a third chamber 720 (with or without a liquid agent therein) coupled to the first fluid chamber 702 via a narrowed flow path, juncture, valve, or constriction 701. The third chamber 708 (with or without a liquid agent therein) can be coupled to the second fluid chamber 704 via a narrowed flow path, juncture, valve, or constriction 706. For example, the first and second fluid chambers 702, 704 can be constructed as dispensing reservoirs, and the third and fourth chambers 720, 708 can be constructed as collapsible reservoirs. The liquid agent may generally pass between the collapsible reservoirs and the connected dispensing reservoirs. In some embodiments, the constrictions between the dispensing reservoir and the corresponding collapsible reservoir may restrict flow such that the liquid agent may readily enter one of the dispensing and collapsible reservoirs but may not readily return to the other reservoir. Alternatively, in some embodiments, the constriction may not be necessary or desirable, such as in the case that the collapsible reservoir and the dispensing reservoir are formed and/or combined as a single reservoir. Alternatively or additionally, the first fluid chamber 702, the second fluid chamber 704, the third chamber 720, and the fourth chamber 708 can each be constructed as collapsible reservoirs.

As shown in FIG. 7A, the first fluid chamber 702 and the second fluid chamber 704 can be arranged side-by-side and can be filled (partially or fully) with a respective liquid agent. In some embodiments, the liquid agent can be injected into respective fluid chamber 702, 704 in a sterile environment during manufacture via a BFS process and sealed within the BFS vial 700 via first fluid 716, second fluid seal 718, and third fluid seal 710 at the respective ports. Each fluid seal 710, 716, 718 may comprise a portion of the molded BFS vial 700, for example, that is configured to be pierced to allow access to the respective chambers. Alternatively or additionally, in some embodiments, each fluid seal 710, 716, 718 can comprise a foil, wax, paper, and/or other thin, pierceable object or layer coupled to the BFS vial 700.

Referring to FIG. 7B, the connection assembly 722 can comprise and/or define a first coupling base member 724 and a bridge member 730. In some embodiments, the bridge member 730 can be formed separate from the first coupling base member 724 and subsequently coupled thereto, e.g., assembled in the field. Alternatively, in some embodiments, the bridge member 730 and the first coupling base member 724 can be coupled together at the time of manufacturing and provided in the kit as a single piece. Alternatively, in some embodiments, the bridge member 730 and the first coupling base member 724 can be formed as a single piece, for example, with the structures of the first coupling base member 724 integrated with the structures of the bridge member 730 without a delineation therebetween.

In the illustrated example of FIG. 7B, the first coupling base member 724 can define a first socket 726 and a second socket 728 at a first longitudinal end, and a third socket 738 and a fourth socket 740 at a second longitudinal end. The first socket 726 can be constructed to receive the first vial neck 705 and the first mounting flange 703 of the BFS vial 700 therein, while the second socket 728 can be constructed to receive the second vial neck 709 and the second mounting flange 707 of the BFS vial 700 therein. The first socket 726 can be in fluid communication (e.g., defining a through-hole) with the third socket 738 such that, when the first coupling base member 724 is coupled to the first longitudinal end 714 of the BFS vial 700, at least the first vial neck 705 (e.g., seal 716) can interact with the portion of the bridge member 730 contained in third socket 738. Similarly, the second socket 728 can be in fluid communication with the fourth socket 740 such that, when the first coupling base member 724 is coupled to the first longitudinal end 714 of the BFS vial 700, at least the second vial neck 709 (e.g., seal 718) can interact with the portion of the bridge member 730 contained in fourth socket 740.

The bridge member 730 can have a pair of coupling or receiving ports with a respective piercing member 732, 734 therein. The piercing members 732, 734 are connected at opposite ends of a laterally-extending bridge conduit 736. In the illustrated example of FIG. 7B, the piercing members 732, 734 and the bridge conduit 736 are formed as an integral structure, for example, a double-end needle bent to have a U-shaped or V-shaped configuration. Alternatively, in some embodiments, the bridge conduit 736 alone, or in combination with the piercing members 732, 734 can follow another 180° curved or rectilinear path. For example, the piercing members 732 and 734 can be oriented such that a direction of flow in the first piercing member 732 (e.g., toward the top of the page in the illustration of FIG. 7B) is opposite to a direction of flow in the second piercing member 734 (e.g., toward the bottom of the page in the illustration of FIG. 7B) during operation of the medical delivery system.

Referring to FIG. 7C, the administration assembly 750 can comprise and/or define a second coupling base member 752, a support hub 754, and an administration conduit 756. In some embodiments, the support hub 754 can be formed separate from the second coupling base member 752 and subsequently coupled thereto, e.g., assembled in the field. Alternatively, in some embodiments, the support hub 754 and the second coupling base member 752 can be coupled together at the time of manufacturing and provided in the kit as a single piece. Alternatively, in some embodiments, the support hub 754 and the second coupling base member 752 can be formed as a single piece, for example, with the structures of the second coupling base member 752 integrated with the structures of the support hub 754 without a delineation therebetween.

In the illustrated example of FIG. 7C, the second coupling base member 752 can define a fifth socket constructed to receive the third vial neck 711 and the third mounting flange 713 of the BFS vial 700 therein. In some embodiments, at least the third vial neck 711 (e.g., seal 710) can interact with the portion of an inlet end **756*b* of administration conduit 756 (e.g., a double-ended needle or cannula) adjacent to the fifth socket. A separate cap or cover 758 can be provided over the administration conduit 756 and releasably coupled to support hub 754 and/or a portion of second coupling base member 752, for example, to protect the administration conduit 442 from damage and/or contamination until ready for use in administering the combined liquid agents to a patient. In some embodiments, the administration conduit 756 is adapted for subcutaneous, intramuscular, intradermal, and intravenous injection. For example, the administration conduit 756 can have a length (e.g., as measured between a bottom longitudinal end of the second coupling base member 752 and an outlet end 756***a* of the administration conduit 756 remote from the second coupling base member 752) in a range of 0.5 mm to 4 mm, inclusive, or in a range of 4 mm to 15 mm, inclusive, or in a range of 15 mm to 30 mm, inclusive.

To assemble the delivery system 760 in preparation for administration of the liquid agents to a patient, the first longitudinal end 714 of the BFS vial 700 can be inserted into the connection assembly 722, with the first and second mounting flanges 703, 707 being received in sockets 726, 728, respectively, as shown in FIG. 7C. Each socket 726, 728 may comprise and/or define (e.g., on or in an interior surface thereof) a shaped seat or a narrow-diameter region that is configured to interact with the respective mounting flange 703, 707 to retain the BFS vial 700 in the inserted configuration (or at least resist removal of the BFS vial 700 from the connection assembly 722 once inserted). Alternatively or additionally, a portion of the flange surrounding the first and second fluid chambers 702, 704 can interact with a surrounding sidewall 731 of the first coupling base member 724 to retain the BFS vial 700 in the inserted configuration. Alternatively or additionally, each coupling port of the bridge member 730 (e.g., on or in an interior surface thereof, for example, at 733) may comprise and/or define a shaped seat or a narrow-diameter region that is configured to interact with a mounting flange of the respective vial neck 705, 709 to retain the BFS vial 700 in the inserted configuration (or at least resist removal of the BFS vial 700 from the connection assembly 722 once inserted). Any or all of the interactions between the connection assembly 722 and the BFS vial 700 to retain the BFS vial 700 in the inserted configuration can comprise an engineering fit, such as a snap-fit, location fit, interference fit, or the like.

In addition, the second longitudinal end 712 of the BFS vial 700 can be inserted into the administration assembly 750, with the third mounting flange 713 being received in the third socket of the second coupling base member 752, as shown in FIG. 7C. The third socket may comprise and/or define (e.g., on or in an interior surface thereof) a shaped seat or a narrow-diameter region that is configured to interact with the third mounting flange 713 to retain the BFS vial 700 in the inserted configuration (or at least resist removal of the BFS vial 700 from the administration assembly 750 once inserted). Alternatively or additionally, a coupling port of the support hub 754 may comprise and/or define a shaped seat or a narrow-diameter region that is configured to interact with a mounting flange of the third vial neck 711 to retain the BFS vial 700 in the inserted configuration (or at least resist removal of the BFS vial 700 from the administration assembly 750 once inserted). Any or all of the interactions between the administration assembly 750 and the BFS vial 700 to retain the BFS vial 700 in the inserted configuration can comprise an engineering fit, such as a snap-fit, location fit, interference fit, or the like.

In some embodiments, the connection assembly 722 and/or the administration assembly 750 may be engaged to couple with the BFS vial 700, or vice versa, via application of a mating longitudinal force (e.g., in a direction substantially parallel to a longitudinal dimension of the vial 700 between its first end 714 and its second end 712). As depicted in FIG. 7C, for example, the vial necks 705, 709 of the BFS vial 700 may be urged and/or forced into the respective sockets 726, 728 until the vial necks 705, 709 become seated in (and/or coupled to or mated with) the coupling ports of the bridge member 730 within sockets 738, 740 of the connection assembly 722. Simultaneously or separately, the third vial neck 711 of the BFS vial 700 may be urged and/or forced into the socket of the administration assembly 750 until the vial neck 711 becomes seated in (and/or coupled to or mated with) the coupling port of the support hub 754 of the administration assembly 750. In some embodiments, the BFS vial 700 may be engaged with connection assembly 722 and/or the administration assembly 750 in two positions or stages. In a first stage or position (e.g., a transport and/or storage stage or position) as depicted, for example, in FIG. 7C, the BFS vial 700 can be partially inserted into the connection assembly 722 and the administration assembly 750, such that the fluid seals 716, 718 are positioned adjacent to and/or aligned with the piercing members 732, 734 and fluid seal 710 is positioned adjacent to and/or aligned with the inlet end 756*b* of the administration conduit 756. In a second stage or position (not shown; e.g., an activation stage or position), the BFS valve 700 may be fully inserted into the connection assembly 722 and the administration assembly 750 (simultaneously or separately) such that piercing elements breach (e.g., pierce, tear, or otherwise extend through) the respective seals 716, 718, thereby providing for fluid communication between the contents of fluid chambers 702, 704, and such that the inlet end 756*b* of the administration conduit 756 breaches (e.g., pierces, tears, or otherwise extends through) the seal 710, thereby providing for fluid communication between the fluid chamber 708 (and thereby to chamber 704 via constriction 706) and the administration conduit 756.

Actuation of the BFS vial 700 (e.g., by applying a compressive force to the first fluid chamber 702 and/or the third chamber 720) can force the liquid agent contained in the first fluid chamber 702 to flow therefrom into the bridge member 730, in particular bridge conduit 736 via respective piercing member 732, and then to second fluid chamber 704 via piercing member 734. Within the second fluid chamber 704, the liquid agents from the first and second fluid chambers can join, mix, and/or otherwise combine prior to introduction into the administration conduit 756. Further actuation of the BFS vial 700 (e.g., by applying a compressive force to the second fluid chamber 704, potentially followed by applying a compressive force to the fourth chamber 708) can cause the combined liquid agents to progress from the second fluid chamber 704 into the administration conduit 756 (e.g., via constriction 706 and fourth chamber 708) and out of an outlet end thereof (and, e.g., into a patient, not shown).

Although FIGS. 7A-7C illustrate specific components and features thereof, embodiments of the disclosed subject matter are not limited thereto. Rather, fewer or additional components than illustrated components 700-758 can be included in the pre-filled medical delivery system 760 according to one or more contemplated embodiments. Moreover, various configurations of illustrated components 700-758 can be included in the pre-filled medical delivery system 760 without deviating from the scope of embodiments described herein. In some embodiments, the components 700-758 may be similar in configuration and/or functionality to similarly named and/or numbered components as described herein.

Figure 8:
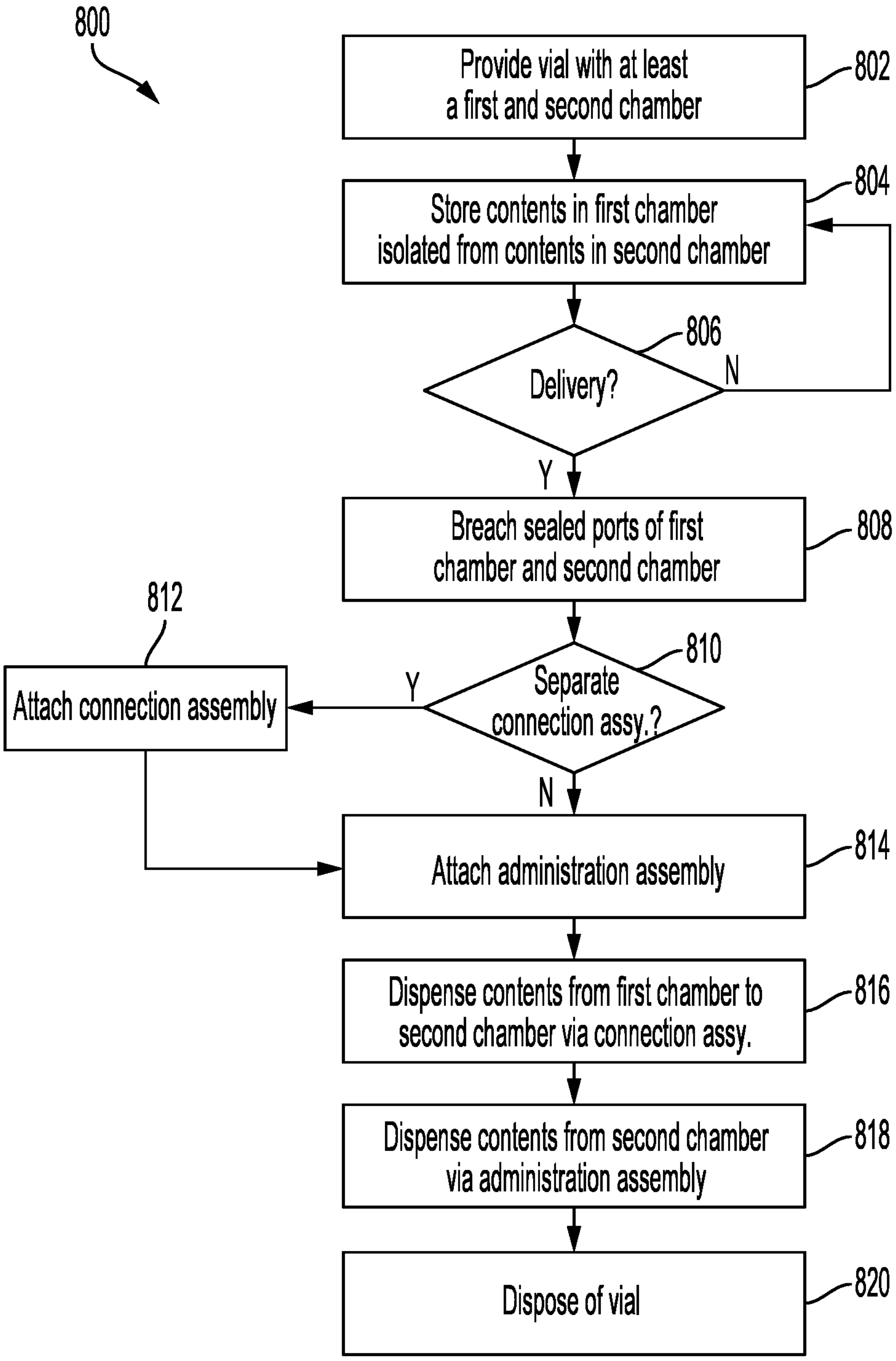
FIG. 8 is a process flow diagram of another exemplary method for assembly and use of a pre-filled medical delivery system for administration of combined liquid agents, according to one or more embodiments of the disclosed subject matter.

V. Method Examples for Administering a Medical Treatment Using Serial System Configurations FIG. 8 illustrates an exemplary method 800 for administering a medical treatment using a pre-filled medical treatment system having a serial configuration. The method 800 can initiate at process block 802, where a vial (e.g., a BFS vial) having at least two chambers separately storing respective liquid agents therein is provided. For example, the vial can be similar to any of the vials described above with the respect to FIGS. 6A-7C. In some embodiments, the provision of process block 802 can include manufacturing the vial with the liquid agents sealed therein, for example, using a BFS manufacturing technique.

The method 800 can proceed to process block 804, where the liquid agent contained in a first chamber of the vial is stored isolated from the liquid agent contained in a second chamber of the vial. In some embodiments, the storing of process block 804 can include providing appropriate environment conditions (e.g., a temperature at or below room temperature (e.g., 20-22° C.) for the vial to maintain viability of the liquid agents contained therein. For example, the vial can be maintained in an as-manufactured sealed configuration, with the contents of the first and second chambers separated from each other and the environment until combination of the separate liquid agents is desired (e.g., just prior to administration to a patient), as determined at decision block 806.

If administration of the liquid agents is desired at decision block 806, the method 800 can proceed to process block 808; otherwise, the method 800 returns to process block 804 to maintain the vial in a sealed state. At process block 808, the contents of the first and second chambers can be accessed, for example, by breaching sealed ports in fluid communication with the first and second chambers. In some embodiments, the breaching of process block 804 can be performed manually (e.g., by pulling, tearing, or otherwise removing a sealing portion) or by using a separate tool (e.g., a nail, pin, needle, or other piercing tool). Alternatively, in some embodiments, the breaching of process block 804 can be performed by using a connection assembly. In some embodiments, the connection assembly can breach the sealed ports of the vial as well provide fluid communication between the breached ports and an administration conduit (which may be part of the connection assembly or a separate component coupled thereto). For example, the connection assembly can be similar to any of the connection assemblies described above with respect to FIGS. 6A-7C.

The method 800 can proceed to decision block 810, where it is determined if coupling of a connection assembly to the vial is necessary. For example, when the breaching of process block 808 was performed manually or by using a separate tool, the method 800 can proceed from decision block 810 to process block 812, where a connection assembly can be coupled to the vial in order to provide fluid communication between the previously breached ports and an administration conduit (which may be part of the connection assembly or a separate component coupled thereto). For example, the connection assembly can be similar to any of the connection assemblies described above with respect to FIGS. 6A-7C. Alternatively, when the breaching of process block 808 was performed using a connection assembly that remains coupled to the vial, the method 800 can proceed from decision block 810 to process block 814.

At process block 814, an administration assembly can be coupled to the vial in order to provide fluid communication between an administration conduit thereof (e.g., needle or cannula) and a third port of the vial. Similar to the other ports described above, the third port may be sealed, and the coupling of the administration assembly can be effective to breach the sealed third port as well as provide fluid communication. Alternatively, in some embodiments, the seal of the third port can be breached manually (e.g., by pulling, tearing, or otherwise removing a sealing portion) or by using a separate tool (e.g., a nail, pin, needle, or other piercing tool) prior to coupling of the administration assembly. For example, the administration assembly can be similar to any of the administration assemblies described above with respect to FIGS. 6A-7C.

At process block 816, the vial can be actuated in order to transfer the first liquid agent from the first chamber to the second chamber. For example, the first chamber (or collapsible reservoir serially connected thereto) can be compressed to dispense the first liquid agent contained therein into the connection assembly and then into the second chamber, where the liquid agents combine.

The method 800 can proceed to process block 818, where the vial can be further actuated in order to administer the combined liquid agents from the second chamber to a patient. For example, the second chamber (or collapsible reservoirs serially connected thereto) can be compressed to dispense the liquid agents contained therein into the administration assembly. The pressure generated by the actuation of the vial can further cause the combined liquid agents to flow through the administration conduit to an outlet end thereof (e.g., a needle tip) where it is administered to a patient. In some embodiments, the administration conduit can comprise a needle, and the dispensing of process block 818 can include inserting an outlet end of the needle into the patient, for example, to effect a subcutaneous, intramuscular, intradermal, and intravenous injection of the combined liquid agents. Alternatively, in some embodiments, the administration conduit can comprise a nozzle, and the dispensing of process block 818 can include inserting an outlet end of the nozzle into an orifice or cavity of the patient (e.g., oral, nasal, ear canal, etc.) or disposing adjacent to an exposed surface of the patient (e.g., for topical application, eyes, etc.) In some embodiments, the dispensing of combined liquid agents of process block 818 is effective to a deliver a single dose of a therapeutic agent to the patient, for example, having a volume of 1 ml or less (e.g., 0.5 ml to 0.75 ml, inclusive). After administration, the administration conduit can be removed from the patient.

The method 800 can proceed to process block 820, where some or all of the components of the pre-filled medical treatment system can be disposed. For example, the vial can be constructed for single use and may be incapable of (or at least undesirable for) reuse once the seals are breached and the liquid agents are dispensed therefrom. In some embodiments, the connection assembly and/or the administration assembly can also be constructed for single use and may be discarded after the administration. Alternatively, in some embodiments, the connection assembly, the administration assembly, and/or parts thereof (e.g., first and second coupling base members, bridge member, support hub, and/or cover) can be retained for reuse, for example, by appropriate cleaning and/or sterilization techniques.

Although some of blocks 802-820 of method 800 have been described as being performed once, in some embodiments, multiple repetitions of a particular process block may be employed before proceeding to the next decision block or process block. In addition, although blocks 802-820 of method 800 have been separately illustrated and described, in some embodiments, process blocks may be combined and performed together (simultaneously or sequentially). Moreover, although FIG. 8 illustrates a particular order for blocks 802-820, embodiments of the disclosed subject matter are not limited thereto. Indeed, in certain embodiments, the blocks may occur in a different order than illustrated or simultaneously with other blocks.

VI. Additional Examples of the Disclosed Technology

In view of the above described implementations of the disclosed subject matter, this application discloses the additional examples in the clauses enumerated below. It should be noted that one feature of a clause in isolation, or more than one feature of the clause taken in combination, and, optionally, in combination with one or more features of one or more further clauses are further examples also falling within the disclosure of this application.

Clause 1. A pre-filled medical delivery system comprising:

a blow-fill-seal (BFS) component comprising:

a first chamber having a first dose of a first fluid or liquid agent therein;

a first port in fluid communication with the first chamber;

a second chamber having a second dose of a second fluid or liquid agent therein; and a second port in fluid communication with the second chamber; and a connection assembly coupled to the BFS component so as to breach seals of the first and second sealed ports and to provide fluid communication between the first and second ports.

Clause 2. The system of any clause or example herein, in particular Clause 1, wherein the first liquid agent, the second liquid agent, or both comprise a vaccine, a drug, a medicament, or a component of any of the foregoing.

Clause 3. The system of any clause or example herein, in particular any one of Clauses 1-2, wherein each of the first and second chambers is constructed as a collapsible reservoir.

Clause 4. The system of any clause or example herein, in particular any one of Clauses 1-3, wherein the seal of each of the first and second sealed ports comprises a foil, wax, paper, a thinned-section of the BFS component, a frangible section of the BFS component, or any combination of the foregoing.

Clause 5. The system of any clause or example herein, in particular any one of Clauses 1-4, wherein the connection assembly is a parallel connection assembly comprising a bridge member and an administration assembly.

Clause 6. The system of any clause or example herein, in particular Clause 5, wherein the bridge member comprises:

a first coupling port with a first piercing member therein;

a second coupling port with a second piercing member therein; and a bridge conduit or mixing chamber, wherein the first and second piercing members are constructed to pierce the seals of the first and second ports, respectively, when the connection assembly is coupled to the BFS component, and the bridge conduit or mixing chamber connects one of the first coupling port and the first piercing member to one of the second coupling port and the second piercing member.

Clause 7. The system of any clause or example herein, in particular any one of Clauses 5-6, wherein the administration assembly comprises:

at least one administration conduit having an outlet at an end thereof spaced from the bridge member, wherein the at least one administration conduit is in fluid communication with the bridge conduit or mixing chamber so as to receive a combination of the first and second liquid agents from the first and second ports.

Clause 8. The system of any clause or example herein, in particular any one of Clauses 5-7, wherein at least part of the administration assembly is formed separate from and constructed to be coupled to the bridge member, or at least part of the administration assembly is integrally formed with the bridge member.

Clause 9. The system of any clause or example herein, in particular any one of Clauses 5-8, wherein the at least one administration conduit comprises a needle or cannula.

Clause 10. The system of any clause or example herein, in particular Clause 9, wherein the needle has a length in a range of 0.5 mm to 4 mm, inclusive, or in a range of 4 mm to 15 mm, inclusive, or in a range of 15 mm to 30 mm, inclusive.

Clause 11. The system of any clause or example herein, in particular any one of Clauses 7-10, wherein the first piercing member, the second piercing member, the bridge conduit, and the administration conduit are parts of a branched structure having a bident configuration.

Clause 12. The system of any clause or example herein, in particular any one of Clauses 7-8, wherein the outlet of the at least one administration conduit is formed as a nozzle configured to facilitate dispersion of the combination of the first and second liquid agents into a spray, or the outlet of the at least one administration conduit is formed as a nozzle configured to facilitate dispersion of the combination of the first and second liquid agents into one or more droplets.

Clause 13. The system of any clause or example herein, in particular any one of Clauses 5-12, wherein the parallel connection assembly further comprises:

a coupling base member comprising:

a first socket in which the first coupling port of the bridge member is disposed;

a second socket in which the second coupling port of the bridge member is disposed;

a third socket in fluid communication with the first socket and constructed to receive the first port of the BFS component therein; and a fourth socket in fluid communication with the second socket and constructed to receive the second port of the BFS component therein.

Clause 14. The system of any clause or example herein, in particular Clause 13, wherein at least part of the coupling base member is formed separate from and constructed to be coupled to the bridge member, or at least part of the coupling base member is integrally formed with the bridge member.

Clause 15. The system of any clause or example herein, in particular any one of Clauses 13-14, wherein at least part of the administration assembly is formed separate from and constructed to be coupled to the bridge member or the coupling base member, or at least part of the administration assembly is integrally formed with the bridge member or the coupling base member.

Clause 16. The system of any clause or example herein, in particular any one of Clauses 1-15, wherein BFS component comprises:

at least one third chamber in fluid communication with the first chamber;

at least one fourth chamber in fluid communication with the second chamber; or any combination of the foregoing.

Clause 17. The system of any clause or example herein, in particular Clause 16, wherein:

the first chamber is in fluid communication with the first port via an intervening one of the at least one third chamber;

the second chamber is in fluid communication with the second port via an intervening one of the at least one fourth chamber; or any combination of the foregoing.

Clause 18. The system of any clause or example herein, in particular any one of Clauses 1-4, wherein the connection assembly is constructed as a serial connection assembly comprising a bridge member.

Clause 19. The system of any clause or example herein, in particular Clause 18, wherein the bridge member comprises:

a first coupling port with a first piercing member therein;

a second coupling port with a second piercing member therein; and a bridge conduit or chamber, wherein the first and second piercing members are constructed to pierce the seals of the first and second ports, respectively, when the connection assembly is coupled to the BFS component, and the bridge conduit or chamber connects one of the first coupling port and the first piercing member to one of the second coupling port and the second piercing member.

Clause 20. The system of any clause or example herein, in particular Clause 19, wherein the serial connection assembly further comprises:

a coupling base member comprising:

a first socket in which the first coupling port of the bridge member is disposed;

a second socket in which the second coupling port of the bridge member is disposed;

a third socket in fluid communication with the first socket and constructed to receive the first port of the BFS component therein; and a fourth socket in fluid communication with the second socket and constructed to receive the second port of the BFS component therein.

Clause 21. The system of any clause or example herein, in particular Clause 20, wherein at least part of the coupling base member is formed separate from and constructed to be coupled to the bridge member, or at least part of the coupling base member is integrally formed with the bridge member.

Clause 22. The system of any clause or example herein, in particular any one of Clauses 18-21, wherein the first piercing member, the second piercing member, and the bridge conduit are parts of a common needle structure.

Clause 23. The system of any clause or example herein, in particular any one of Clauses 18-22, wherein:

the first piercing member, the second piercing member, and the bridge conduit or chamber form a flow path between the first and second ports of the BFS component, and the flow path is shaped such that a direction of flow from the first port into the flow path is opposite to a direction of flow from the flow path into the second port.

Clause 24. The system of any clause or example herein, in particular any one of Clauses 18-23, wherein:

the BFS component further comprises a third sealed port in fluid communication with the second chamber;

the delivery system further comprises an administration assembly constructed to be coupled to the BFS component so as to breach a seal of the third sealed port; and the administration assembly comprises a hub supporting at least one administration conduit having an outlet at a first end thereof spaced from the third port of the BFS component.

Clause 25. The system of any clause or example herein, in particular Clause 24, wherein the at least one administration conduit comprises a needle or cannula.

Clause 26. The system of any clause or example herein, in particular Clause 25, wherein the needle has a length in a range of 0.5 mm to 4 mm, inclusive, or in a range of 4 mm to 15 mm, inclusive, or in a range of 15 mm to 30 mm, inclusive.

Clause 27. The system of any clause or example herein, in particular Clause 24, wherein the outlet of the at least one administration conduit is formed as a nozzle configured to facilitate dispersion of the combination of the first and second liquid agents into a spray, or the outlet of the at least one administration conduit is formed as a nozzle configured to facilitate dispersion of the combination of the first and second liquid agents into one or more droplets.

Clause 28. The system of any clause or example herein, in particular any one of Clauses 24-27, wherein the administration assembly further comprises:

a second coupling base member comprising:

a fifth socket in which a second end of the administration conduit is disposed; and a sixth socket in fluid communication with the fifth socket and constructed to receive the third port of the BFS component therein.

Clause 29. The system of any clause or example herein, in particular Clause 28, wherein at least part of the hub is formed separate from and constructed to be coupled to the second coupling base member, or at least part of the hub is integrally formed with the second coupling base member.

Clause 30. The system of any clause or example herein, in particular any one of Clauses 18-29, wherein the BFS component comprises:

at least one third chamber in fluid communication with the first chamber;

at least one fourth chamber in fluid communication with the second chamber; or any combination of the foregoing.

Clause 31. The system of any clause or example herein, in particular Clause 30, wherein:

the first chamber is in fluid communication with the first port via an intervening one of the at least one third chamber;

the second chamber is in fluid communication with the second port via an intervening one of the at least one fourth chamber;

the second chamber is in fluid communication with the third port via an intervening one of the at least one fourth chamber; or any combination of the foregoing.

Clause 32. A pre-filled medical delivery system comprising:

a blow-fill-seal (BFS) component comprising:

a first chamber having a first liquid agent therein;

a first sealed port in fluid communication with the first chamber;

a second chamber having a second liquid agent therein; and a second sealed port in fluid communication with the second chamber; and means for fluidically coupling together the first and second ports.

Clause 33. The system of any clause or example herein, in particular clause 32, wherein the means for fluidically coupling further comprises means for administering a combination of the first and second liquid agents to a patient.

Clause 34. The system of any clause or example herein, in particular clause 32, further comprising means for administering a combination of the first and second liquid agents to a patient.

Clause 35. A kit comprising multiple components to be assembled to form the pre-filled medical delivery system of any clause or example herein, in particular, any one of Clauses 1-34.

Clause 36. A pre-filled medical delivery kit comprising:

a blow-fill-seal (BFS) component comprising:

a first chamber having a first dose of a first fluid or liquid agent therein;

a first port in fluid communication with the first chamber;

a second chamber having a second dose of a second fluid or liquid agent therein; and a second port in fluid communication with the second chamber; and a connection assembly constructed to be coupled to the BFS component so as to breach seals of the first and second sealed ports and to provide fluid communication between the first and second ports.

Clause 37. The kit of any clause or example herein, in particular Clause 36, wherein the connection assembly comprises:

a bridge member and an administration assembly constructed to be coupled to the bridge member; or a bridge member and an administration assembly, at least part of the administration assembly being integrally formed with the bridge member.

Clause 38. The kit of any clause or example herein, in particular Clause 37, wherein:

the bridge member comprises:

a first coupling port with a first piercing member therein;

a second coupling port with a second piercing member therein; and a bridge conduit or mixing chamber, wherein the first and second piercing members are constructed to pierce the seals of the first and second ports, respectively, when the connection assembly is coupled to the BFS component, and the bridge conduit or mixing chamber is constructed to connect one of the first coupling port and the first piercing member to one of the second coupling port and the second piercing member; and/or the administration assembly comprises:

at least one administration conduit having an outlet at an end thereof, wherein the at least one administration conduit is in fluid communication with the bridge conduit or mixing chamber so as to receive a combination of the first and second liquid agents from the first and second ports, when the connection assembly is coupled to the BFS component.

Clause 39. The kit of any clause or example herein, in particular Clause 36, wherein the connection assembly comprises a bridge member.

Clause 40. The kit of any clause or example herein, in particular Clause 39, wherein the bridge member comprises:

a first coupling port with a first piercing member therein;

a second coupling port with a second piercing member therein; and a bridge conduit or chamber, wherein the first and second piercing members are constructed to pierce the seals of the first and second ports, respectively, when the connection assembly is coupled to the BFS component, and the bridge conduit or chamber is constructed to connect one of the first coupling port and the first piercing member to one of the second coupling port and the second piercing member.

Clause 41. The kit of any clause or example herein, in particular any one of Clauses 39-40, wherein:

the BFS component further comprises a third sealed port in fluid communication with the second chamber;

the kit further comprises an administration assembly constructed to be coupled to the BFS component so as to breach a seal of the third sealed port; and the administration assembly comprises a hub supporting at least one administration conduit having an outlet at a first end thereof.

Clause 42. The kit of any clause or example herein, in particular Clause 41, wherein the administration assembly further comprises a second coupling base member comprising:

a fifth socket constructed to receive a second end of the administration conduit therein; and a sixth socket in fluid communication with the fifth socket and constructed to receive the third port of the BFS component therein.

Clause 43. The kit of any clause or example herein, in particular any one of Clauses 36-42, wherein the connection assembly further comprises:

a first coupling base member constructed to be coupled to the bridge member and/or the administration assembly; or a first coupling base member, at least part of which is integrally formed with the bridge member and/or the administration assembly.

Clause 44. The kit of any clause or example herein, in particular Clause 43, wherein the first coupling base member comprises:

a first socket constructed to receive the first coupling port of the bridge member therein;

a second socket constructed to receive the second coupling port of the bridge member therein;

a third socket in fluid communication with the first socket and constructed to receive the first port of the BFS component therein; and a fourth socket in fluid communication with the second socket and constructed to receive the second port of the BFS component therein.

Clause 45. The kit of any clause or example herein, in particular any one of Clauses 36-44, wherein the at least one administration conduit comprises a needle or cannula.

Clause 46. The kit of any clause or example herein, in particular Clause 45, wherein the needle has a length in a range of 0.5 mm to 4 mm, inclusive, or in a range of 4 mm to 15 mm, inclusive, or in a range of 15 mm to 30 mm, inclusive.

Clause 47. The kit of any clause or example herein, in particular any one of Clauses 36-46, wherein the first liquid agent, the second liquid agent, or both comprise a vaccine, a drug, a medicament, or a component of any of the foregoing.

Clause 48. The kit of any clause or example herein, in particular any one of Clauses 36-47, wherein each of the first and second chambers is constructed as a collapsible reservoir.

Clause 49. The kit of any clause or example herein, in particular any one of Clauses 36-48, wherein the seal of each sealed port comprises a foil, wax, paper, a thinned-section of the BFS component, a frangible section of the BFS component, or any combination of the foregoing.

Clause 50. The kit of any clause or example herein, in particular any one of Clauses 36-49, wherein BFS component comprises:

at least one third chamber in fluid communication with the first chamber;

at least one fourth chamber in fluid communication with the second chamber; or any combination of the foregoing.

Clause 51. The kit of any clause or example herein, in particular any Clause 50, wherein:

the first chamber is in fluid communication with the first port via an intervening one of the at least one third chamber;

the second chamber is in fluid communication with the second port via an intervening one of the at least one fourth chamber;

the second chamber is in fluid communication with the third port via an intervening one of the at least one fourth chamber; or any combination of the foregoing.

Clause 52. A method of administering a medical treatment comprising:

coupling the connection assembly to the BFS component of a kit to form the pre-filled medical delivery system of any clause or example herein, in particular any one of Clause 1-34;

combining the first and second liquid agents; and administering the combined liquid agents to a patient.

Clause 53. The method of any clause or example herein, in particular Clause 52, wherein the connection assembly comprises an administration assembly for administering the combined liquid agents to the patient, and the combining comprises flowing the first and second liquid agents into a common volume of the connection assembly upstream of an administration conduit of the administration assembly.

Clause 54. The method of any clause or example herein, in particular Clause 52, further comprising, prior to the administering, coupling an administration assembly to the BFS component for administering the combined liquid agents to the patient.

Clause 55. The method of any clause or example herein, in particular Clause 54, wherein the combining comprises flowing the first liquid agent from the first chamber into the second chamber with the second liquid agent via the connection assembly.

Clause 56. The method of any clause or example herein, in particular Clause 52, further comprising, prior to the coupling, breaching seals of the first and second ports.

Clause 57. The method of any clause or example herein, in particular any one of Clauses 52-56, wherein the administering is via subcutaneous, intramuscular, intradermal, and intravenous injection of the combined liquid agents.

Clause 58. The method of any clause or example herein, in particular any one of Clauses 52-57, wherein:

a combined volume of all of liquid-agent-containing chambers of the BFS component is in a range of 0.50 ml to 0.75 ml, inclusive;

a combined volume of all liquid agents in the BFS component is in a range of 0.50 ml to 0.75 ml, inclusive; or both of the above.

Clause 59. The method of any clause or example herein, in particular any one of Clauses 52-58, wherein the administering delivers the combined liquid agents as a single dose of a therapeutic agent to the patient.

Clause 60. The method of any clause or example herein, in particular any one of Clauses 52-59, further comprising, prior to the coupling, filling the first and second liquid agents in the first and second chambers, respectively, using a blow-fill-seal technique.

Clause 61. The system, kit, or method of any clause or example herein, in particular any one of Clauses 1-60, wherein the BFS component comprises a first BFS vial and a second BFS vial, the first BFS vial comprises the first chamber, and the second BFS vial comprises the second chamber

VII. Rules of Interpretation

Any of the features illustrated or described with respect to FIGS. 1A-8 and Clauses 1-61 can be combined with any other features illustrated or described with respect to FIGS. 1A-8 and Clauses 1-61 to provide systems, assemblies, kits, devices, methods, and embodiments not otherwise illustrated or specifically described herein. For example, the features regarding more than two chambers in a BFS vial, as described with respect to FIG. 6F, can be applied to any other BFS vial, described herein or otherwise, for example, the BFS vials described with respect to FIGS. 1A-6E and 7A-8. In another example, the parallel combination schemes as described with respect to FIGS. 1A-1B, 3A-3C and/or the parallel connection assemblies as described with respect to FIGS. 2A-2D, 4A-4C can be combined with the serial connection assemblies as described with respect to FIGS. 6A-7C. In still another example, the nozzle for the administration assembly, as described with respect to FIG. 2D, can be applied to any other connection assembly or administration assembly, described herein or otherwise, for example, the connection assemblies of FIGS. 2A-2C, 4A-4C, and 5, or the administration assemblies of FIGS. 6C-6F, 7A-7C, and 8. Other combinations and variations are also possible according to one or more contemplated embodiments. All features described herein are independent of one another and, except where structurally impossible, can be used in combination with any other feature described herein.

Any or all of the components disclosed herein can be formed of one or more plastics. In some embodiments, some components (e.g., the BFS vials) can be formed of a relatively soft polymer (e.g., having a Shore/Durometer "D" hardness of between 60 and 70), such as polyethylene, polypropylene, or any other polymer adaptable for use in a BFS manufacturing process. In some embodiments, some components (e.g., the connection assemblies, the administration assemblies, and/or needle caps or covers) can be formed, at least in part, of a relatively hard polymer (e.g., having a hardness greater than 80 on the Rockwell "R" scale), such as, but not limited to, polybenzimidazole, acrylonitrile butadiene styrene (ABS), polystyrene, polyvinyl chloride, or the like. Other materials are also possible according to one or more contemplated embodiments.

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments.

Neither the Title (set forth at the beginning of the first page of this patent application) nor the Abstract (set forth at the end of this patent application) is to be taken as limiting in any way as the scope of the disclosed invention(s).

While the term "vial" is utilized herein for convenience and ease of illustration, objects represented and/or described as "vials" may comprise various forms, configurations, and/or quantities of components. A BFS vial may comprise one or more BFS products that are formed and/or manufactured together or separately, for example, and/or may comprise one or more BFS chambers, bottles, containers, and/or other fluid-retaining objects. The term "vial" does not convey any designation of shape or size. In some embodiments, a BFS component may comprise one or more vials. According to some embodiments a BFS component and/or a BFS vial may comprise one or more fluid chambers. In some embodiments, a plurality of BFS components, vials, and/or chambers may be manufactured simultaneously from a single BFS mold. Each respective vial and/or chamber may be formed, for example, by different portions of a single BFS mold (e.g., two cooperative halves thereof). In some embodiments, BFS components, vials, and/or chambers may be joined and/or coupled during manufacturing (e.g., via unformed and/or fused connecting parison) and/or after manufacturing/filling.

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices which are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining and the like The terms "including", "comprising" and variations thereof mean "including but not limited to", unless expressly specified otherwise. As used herein, "comprising" means "including," and the singular forms "a" or "an" or "the" include plural references unless the context clearly dictates otherwise. The term "or" refers to a single element of stated alternative elements or a combination of two or more elements, unless the context clearly indicates otherwise A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods, as known to those of ordinary skill in the art. When directly and explicitly distinguishing embodiments from discussed prior art, the embodiment numbers are not approximates unless the word "about" is recited. Whenever "substantially," "approximately," "about," or similar language is explicitly used in combination with a specific value, variations up to and including ten percent (10%) of that value are intended, unless explicitly stated otherwise.

Directions and other relative references may be used to facilitate discussion of the drawings and principles herein, but are not intended to be limiting. For example, certain terms may be used such as "inner," "outer,", "upper," "lower," "top," "bottom," "interior," "exterior," "left," right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A pre-filled medical delivery system comprising:

a blow-fill-seal (BFS) component comprising:
- a compressible first chamber having a first dose of a first liquid agent therein;
- a first sealed port in fluid communication with the first chamber;
- a compressible second chamber connected to the first chamber, the second chamber having a second dose of a second liquid agent therein; and
- a second sealed port in fluid communication with the second chamber; and a connection assembly constructed to be coupled to the BFS component so as to breach seals of the first and second sealed ports and to provide fluid communication between the first and second ports, the connection assembly including:
- a first coupling port defining a first port wall and having a first piercing member extending within a first interior of the first port wall;
- a second coupling port defining a second port wall and having a second piercing member extending within a second interior of the second port wall; and
- a bridge conduit or mixing chamber in fluid communication with the first coupling port and the second coupling port; and at least one administration conduit having an outlet at an end thereof spaced from the bridge conduit or the mixing chamber, the at least one administration conduit being in fluid communication with the bridge conduit or the mixing chamber;

wherein when the connection assembly is coupled to the BFS component:

the first and second coupling ports respectively receive at least portions of the first and second chambers such that the first and second port walls engage the portions of the first and second chambers in coupled relation therewith to couple the BFS component relative to the connection assembly;

the first and second piercing members respectively pierce the first and second sealed ports, and the bridge conduit or the mixing chamber fluidly connects one of the first coupling port and the first piercing member with one of the second coupling port and the second piercing member; and wherein compression of the first chamber and the second chamber causes respective egress of the first and second fluid agents from the first and second chambers into the bridge conduit or the mixing chamber such that a combination of the first liquid agent and the second liquid agent is dispensed through the administration conduit.

2. The delivery system of claim 1, wherein the first liquid agent, the second liquid agent, or both comprise a vaccine, a drug, a medicament, or a component of any of the foregoing.

3. The delivery system of claim 1, wherein each of the first and second chambers is constructed as a collapsible reservoir.

4. The delivery system of claim 1, wherein the seal of each of the first and second sealed ports comprises a foil, wax, paper, a thinned-section of the BFS component, a frangible section of the BFS component, or any combination of the foregoing.

5. The delivery system of claim 1, wherein at least part of the administration assembly is formed separate from and constructed to be coupled to the bridge member, or at least part of the administration assembly is integrally formed with the bridge member.

6. The delivery system of claim 1, wherein the at least one administration conduit comprises a needle or cannula.

7. The delivery system of claim 6, wherein the needle has a length in a range of 0.5 mm to 4 mm, inclusive, or in a range of 4 mm to 15 mm, inclusive, or in a range of 15 mm to 30 mm, inclusive.

8. The delivery system of claim 6, wherein the first piercing member, the second piercing member, the bridge conduit, and the needle are parts of a branched needle structure in a bident configuration.

9. The delivery system of claim 1, wherein the connection assembly further comprises:

a coupling base member comprising:

a first socket in which the first coupling port of the bridge member is disposed;

a second socket in which the second coupling port of the bridge member is disposed;

a third socket in fluid communication with the first socket and constructed to receive the first port of the BFS component therein; and a fourth socket in fluid communication with the second socket and constructed to receive the second port of the BFS component therein.

10. The delivery system of claim 9, wherein at least part of the coupling base member is formed separate from and constructed to be coupled to the bridge member, or at least part of the coupling base member is integrally formed with the bridge member.

11. The delivery system of claim 9, wherein at least part of the administration assembly is formed separate from and constructed to be coupled to the bridge member or the coupling base member, or at least part of the administration assembly is integrally formed with the bridge member or the coupling base member.

12. The delivery system of claim 1, wherein the outlet of the at least one administration conduit is formed as a nozzle configured to facilitate dispersion of the combination of the first and second liquid agents into a spray, or the outlet of the at least one administration conduit is formed as a nozzle configured to facilitate dispersion of the combination of the first and second liquid agents into one or more droplets.

13. The delivery system of claim 1, wherein the connection assembly is constructed as a serial connection assembly comprising:

a bridge member comprising:

a first coupling port with a first piercing member therein;

a second coupling port with a second piercing member therein; and a bridge conduit or chamber, wherein the first and second piercing members are constructed to pierce the seals of the first and second ports, respectively, when the connection assembly is coupled to the BFS component, and the bridge conduit or chamber connects one of the first coupling port and the first piercing member to one of the second coupling port and the second piercing member.

14. The delivery system of claim 13, wherein the serial connection assembly further comprises:

a coupling base member comprising:

a first socket in which the first coupling port of the bridge member is disposed;

a second socket in which the second coupling port of the bridge member is disposed;

a third socket in fluid communication with the first socket and constructed to receive the first port of the BFS component therein; and a fourth socket in fluid communication with the second socket and constructed to receive the second port of the BFS component therein.

15. The delivery system of claim 14, wherein at least part of the coupling base member is formed separate from and constructed to be coupled to the bridge member, or at least part of the coupling base member is integrally formed with the bridge member.

16. The delivery system of claim 13, wherein the first piercing member, the second piercing member, and the bridge conduit are parts of a common needle structure.

17. The delivery system of claim 13, wherein, when the serial connection assembly is coupled to the BFS component:

the first piercing member, the second piercing member, and the bridge conduit or chamber form a flow path between the first and second ports of the BFS component, and the flow path is shaped such that a direction of flow from the first port into the flow path is opposite to a direction of flow from the flow path into the second port.

18. The delivery system of claim 1, wherein the BFS component comprises a first BFS component and a second BFS component, the first BFS component comprises the first chamber, and the second BFS component comprises the second chamber.

19. The delivery system of claim 1, wherein the connection assembly includes the mixing chamber defining an open mixing volume into which the first and second fluid agents are deposited upon exiting the first and second coupling ports, to thereby enable the first and second fluid agents to mix and form the combination of the first and second fluid agents.

20. A pre-filled delivery system comprising:

a blow-fill-seal (BFS) component comprising:

a first chamber having a first dose of a first liquid agent therein;

a first sealed port in fluid communication with the first chamber;

a second chamber having a second dose of a second liquid agent therein; and a second sealed port in fluid communication with the second chamber; and a connection assembly constructed to be coupled to the BFS component so as to breach seals of the first and second sealed ports and to provide fluid communication between the first and second ports, wherein the connection assembly is constructed as a serial connection assembly comprising:

a bridge member comprising:

a first coupling port with a first piercing member therein;

a second coupling port with a second piercing member therein; and a bridge conduit or chamber, wherein the first and second piercing members are constructed to pierce the seals of the first and second ports, respectively, when the connection assembly is coupled to the BFS component, and wherein the bridge conduit or chamber connects one of the first coupling port and the first piercing member to one of the second coupling port and the second piercing member;

wherein the BFS component further comprises a third sealed port in fluid communication with the second chamber;

wherein the delivery system further comprises an administration assembly constructed to be coupled to the BFS component so as to breach a seal of the third sealed port; and wherein the administration assembly comprises a hub supporting at least one administration conduit having an outlet at a first end thereof spaced from the third port of the BFS component.

21. The delivery system of claim 20, wherein the at least one administration conduit comprises a needle or cannula.

22. The delivery system of claim 21, wherein the needle has a length in a range of 0.5 mm to 4 mm, inclusive, or in a range of 4 mm to 15 mm, inclusive, or in a range of 15 mm to 30 mm, inclusive.

23. The delivery system of claim 20, wherein the administration assembly further comprises:

a second coupling base member comprising:

a fifth socket in which a second end of the administration conduit is disposed; and a sixth socket in fluid communication with the fifth socket and constructed to receive the third port of the BFS component therein.

24. The delivery system of claim 23, wherein at least part of the hub is formed separate from and constructed to be coupled to the second coupling base member, or at least part of the hub is integrally formed with the second coupling base member.

25. The delivery system of claim 20, wherein the outlet of the at least one administration conduit is formed as a nozzle configured to facilitate dispersion of the combination of the first and second liquid agents into a spray, or the outlet of the at least one administration conduit is formed as a nozzle configured to facilitate dispersion of a combination of the first and second liquid agents into one or more droplets.

26. The delivery system of claim 20, wherein the BFS component comprises:

at least one third chamber in fluid communication with the first chamber;

at least one fourth chamber in fluid communication with the second chamber; or any combination of the foregoing.

27. The delivery system of claim 26, wherein:

the first chamber is in fluid communication with the first port via an intervening one of the at least one third chamber;

the second chamber is in fluid communication with the second port via an intervening one of the at least one fourth chamber;

the second chamber is in fluid communication with the third port via an intervening one of the at least one fourth chamber; or any combination of the foregoing.

* * * * *